(12) United States Patent
Lee et al.

(10) Patent No.: US 10,818,209 B2
(45) Date of Patent: Oct. 27, 2020

(54) DISPLAY APPARATUS

(71) Applicant: SAMSUNG ELECTRONICS CO., LTD., Suwon-si (KR)

(72) Inventors: Young Chol Lee, Hwaseong-si (KR); Wook-Jae Jeon, Hwaseong-si (KR); Tae Ik Kim, Seoul (KR); Il Yong Jung, Yongin-si (KR); Byoung-Jin Cho, Anyang-si (KR); Jun Sung Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 74 days.

(21) Appl. No.: 16/155,259

(22) Filed: Oct. 9, 2018

(65) Prior Publication Data
US 2019/0122597 A1  Apr. 25, 2019

(30) Foreign Application Priority Data
Oct. 19, 2017 (KR) .......................... 10-2017-0135982

(51) Int. Cl.
G09G 3/18 (2006.01)
G02F 1/1335 (2006.01)
(Continued)

(52) U.S. Cl.
CPC ............... G09G 3/18 (2013.01); G02B 5/003 (2013.01); G02F 1/133504 (2013.01);
(Continued)

(58) Field of Classification Search
CPC ............ G02B 5/003; G02F 1/133504; G02F 1/133528; G02F 2001/133562; G02F 2001/1351; G02F 2201/08; G09G 3/18
See application file for complete search history.

(56) References Cited

U.S. PATENT DOCUMENTS

2008/0007677 A1* 1/2008 Enomoto .......... G02F 1/133504
349/106
2015/0062491 A1 3/2015 Sakuragi et al.
(Continued)

FOREIGN PATENT DOCUMENTS

EP    1 767 985 A1    3/2007
JP    2006-201577 A   8/2006
(Continued)

OTHER PUBLICATIONS

International Search Report dated Feb. 12, 2019 issued by the International Searching Authority in counterpart International Patent Application No. PCT/KR2018/012352. (PCT/ISA/210).
(Continued)

*Primary Examiner* — Kenneth Bukowski
(74) *Attorney, Agent, or Firm* — Sughrue Mion, PLLC

(57) ABSTRACT

A display apparatus includes a display panel receiving light from a light source. The display panel includes a liquid crystal panel, first and second polarizers respectively disposed on front and rear sides of the liquid crystal panel, and an optical layer disposed on a front surface of the second polarizer. The optical layer includes a first resin layer having light absorption portions for absorbing a portion of incident light, a second resin layer disposed on a front surface of the first resin layer, the second resin layer having a higher refractive index than the first resin layer, the second resin layer having light diffusion portions for diffusing light not absorbed by the light absorption portions.

21 Claims, 27 Drawing Sheets

(51) Int. Cl.
  *G02B 5/00*    (2006.01)
  *G02F 1/135*    (2006.01)
(52) U.S. Cl.
  CPC .................. *G02F 1/133528* (2013.01); *G02F 2001/1351* (2013.01); *G02F 2001/133562* (2013.01); *G02F 2201/08* (2013.01)

(56) References Cited

U.S. PATENT DOCUMENTS

| | | |
|---|---|---|
| 2015/0285963 A1 | 10/2015 | Asaoka et al. |
| 2016/0252665 A1 | 9/2016 | Lee et al. |

FOREIGN PATENT DOCUMENTS

| | | | |
|---|---|---|---|
| JP | 2006-267778 | A | 10/2006 |
| JP | 5098575 | B2 | 12/2012 |
| JP | 5859928 | B2 | 2/2016 |
| KR | 10-2007-0014436 | A | 2/2007 |
| KR | 10-2010-0003486 | A | 1/2010 |

OTHER PUBLICATIONS

Communication dated Feb. 18, 2019 issued by the European Patent Office in counterpart European Patent Application No. 18188720.9.

\* cited by examiner

DISPLAY APPARATUS

CROSS-REFERENCE TO RELATED APPLICATION(S)

This application is based on and claims priority under 35 U.S.C. § 119 to Korean Patent Application No. 10-2017-0135982, filed on Oct. 19, 2017, in the Korean Intellectual Property Office, the disclosure of which is incorporated by reference herein in its entirety.

BACKGROUND

1. Field

The disclosure relates to a display apparatus, and more particularly, to a display apparatus having an improved viewing angle.

2. Description of Related Art

A display apparatus converts acquired or stored electrical information into visual information and displays the visual information for a user. Display apparatuses are widely used in various fields, such as in the home and in places of business.

In general, a display apparatus displays a screen, and examples of the display apparatus include a monitor or a television. The display apparatus uses a self-emitting display panel such as an organic light-emitting diode (OLED) panel, or a light-receiving display panel such as a liquid crystal display (LCD) panel.

A display apparatus may have difficulty in providing a perfectly black screen due to a light source. That is, since the light source is turned on while the display apparatus operates, it is difficult to express black on a display screen due to light.

SUMMARY

Provided is a display apparatus is capable of improving color reproducibility.

Also provided is a display apparatus capable of improving a difference in light amount according to a viewing angle.

Additional aspects and/or advantages will be set forth in part in the description which follows and, in part, will be apparent from the description, or may be learned by practice of the disclosure.

According to an aspect of the disclosure, there is provided a display apparatus including: a light source configured to emit light; a display panel configured to receive the light emitted by the light source, wherein the display panel includes: a liquid crystal panel; a first polarizer disposed behind the liquid crystal panel; a second polarizer disposed in front of the liquid crystal panel; and an optical layer disposed on a front surface of the second polarizer, and wherein the optical layer includes: a first resin layer including a plurality of light absorption portions configured to absorb a part of incident light; a second resin layer disposed on a front surface of the first resin layer, the second resin layer having a refractive index that is higher than a refractive index of the first resin layer, and the second resin layer including a plurality of light diffusion portions configured to diffuse light not absorbed by the plurality of light absorption portions.

The light emitted by the light source to the display panel may pass through the first polarizer, the liquid crystal panel, and the second polarizer, sequentially, and be incident upon the optical layer.

The plurality of light absorption portions may be configured to absorb light incident at a predetermined angle or more with respect to a reference axis in a front-rear direction of the display apparatus among light incident upon the optical layer.

The plurality of light diffusion portions may be configured to diffuse light not absorbed by the plurality of light absorption portions and incident upon the light diffusion portions at the predetermined angle or less with respect to the reference axis.

Each of the plurality of light diffusion portions may include a diffusion surface that is inclined with respect to an optical surface facing the first resin layer in the second resin layer, and configured to refract light passed through the first resin layer to be further tilted with respect the reference axis in the front-rear direction.

Each of the plurality of light diffusion portions may include a concave optical surface that is formed in parallel to the optical surface, stepped from the optical surface, connected to the diffusion surface, and configured to transmit light incident upon the concave optical surface at a reduced angle with respect to the reference axis in the front-rear direction.

The first resin layer may include: a first optical surface that is in contact with the plurality of light diffusion portions; a second optical surface that is opposite to the first optical surface; and a plurality of grooves formed concavely in the second optical surface such that the plurality of light absorption portions are disposed in the plurality of grooves.

The plurality of light diffusion portions may be formed on an optical surface facing the first resin layer in the second resin layer, and a cross section of the plurality of light diffusion portions is formed in a concave-convex shape.

The concave-convex shape may include at least one of a trapezoid, a quadrangle, a semicircle, and an oval.

The plurality of light diffusion portions may extend in a first direction on the second resin layer, and are arranged in a second direction that is orthogonal to the first direction.

The first direction may be one of a longitudinal direction, a transverse direction, and a diagonal direction.

The plurality of light diffusion portions may extend in a shape of waves in the first direction.

The plurality of light absorption portions may extend in the first direction, and may be arranged in the second direction.

The plurality of light absorption portions may extend in a direction that is different from the first direction, and may be arranged in a direction that is orthogonal to the direction in which the plurality of light absorption portions extend.

The plurality of light diffusion portions may be formed in a shape of dots, and may be distributed on the second resin layer so as to be spaced apart from each other.

The plurality of light diffusion portions may include: a first diffusion portion; a second diffusion portion spaced a first distance from the first diffusion portion; and a third diffusion portion spaced a second distance from the second diffusion portion, wherein the first distance is different from the second distance.

The display panel further may include an adhesive layer provided between the optical layer and the second polarizer, wherein the adhesive layer is formed with a refractive index that is equal to or smaller than a refractive index of the first resin layer.

According to an aspect of the disclosure, there is provided a display apparatus including: a light source configured to emit light; and a display panel configured to receive the light emitted by the light source, wherein the display panel includes: a liquid crystal panel; a first polarizer coupled with a rear portion of the liquid crystal panel; a second polarizer coupled with a front portion of the liquid crystal panel; and an optical layer disposed on a front surface of the second polarizer, wherein light sequentially passed through the first polarizer, the liquid crystal panel, and the second polarizer is incident upon the optical layer, and wherein the optical layer includes: a resin layer; a light absorption portion provided in the resin layer, the light absorption portion being configured to absorb a part of light passing through the optical layer; and a light diffusion portion configured to diffuse light passed through the light absorption portion.

The resin layer may include: a first resin layer on which the light absorption portion is disposed; and a second resin layer contacting the first resin layer, the second resin layer having a refractive index that is higher than a refractive index the first resin layer, wherein the light diffusion portion includes: a diffusion surface inclined with respect to an optical surface facing the first resin layer in the second resin layer; and a concave optical surface formed parallel to the optical surface, stepped from the optical surface, and connected to the diffusion surface.

According to an aspect of the disclosure, there is provided a display apparatus including: a light source configured to emit light; and a display panel configured to receive the light emitted by the light source, wherein the display panel includes: a liquid crystal panel; a first polarizer coupled with a rear portion of the liquid crystal panel; a second polarizer coupled with a front portion of the liquid crystal panel; and an optical layer coupled with a front surface of the second polarizer, wherein the optical layer includes: a first resin layer having a first optical surface and a groove recessed in the first optical surface; a second resin layer being in contact with a second optical surface that is opposite to the first optical surface of the first resin layer, the second resin layer having a refractive index that is higher than the refractive index of the first resin layer; and a light absorption portion disposed in the groove, the light absorption portion being configured to absorb a part of light passing through the optical layer, and wherein the first resin layer and the second resin layer are configured to contact each other to form a concave-convex shape, and configured such that light not absorbed by the light absorption portion passes through the concavo-convex shape.

BRIEF DESCRIPTION OF THE DRAWINGS

The above and/or other aspects, features, and advantages of certain embodiments will become more apparent from the following description taken in conjunction with the accompanying drawings, in which.

DETAILED DESCRIPTION

Figure 1:
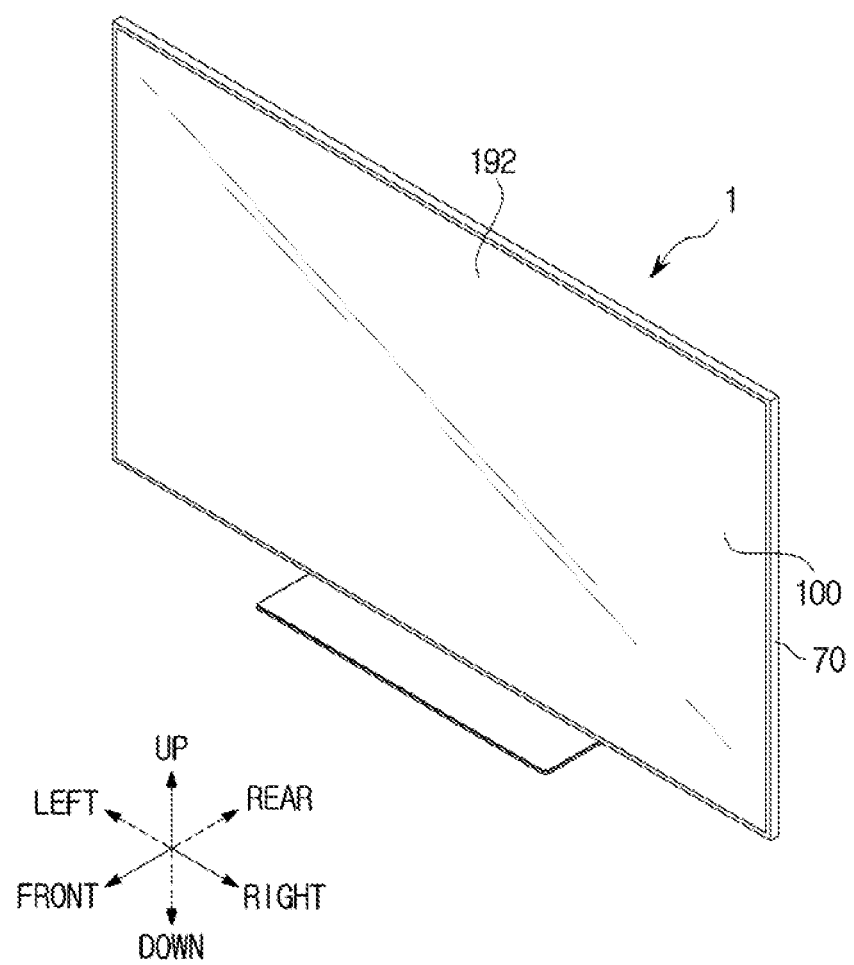
FIG. 1 is a perspective view of a display apparatus according to an embodiment.

Configurations illustrated in the embodiments and the drawings described in the present specification are only the preferred embodiments of the present disclosure, and thus it is to be understood that various modified examples, which may replace the embodiments and the drawings described in the present specification, are possible.

Also, like reference numerals or symbols denoted in the drawings of the present specification represent members or components that perform substantially the same functions.

The terms used in the present specification are used to describe the embodiments of the present disclosure. Accordingly, it should be apparent to those skilled in the art that the following description of embodiments of the present disclosure is provided for illustration purpose only and not for the purpose of limiting the disclosure as defined by the appended claims and their equivalents. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, the embodiments will be described in detail with reference to the accompanying drawings.

Figure 2:
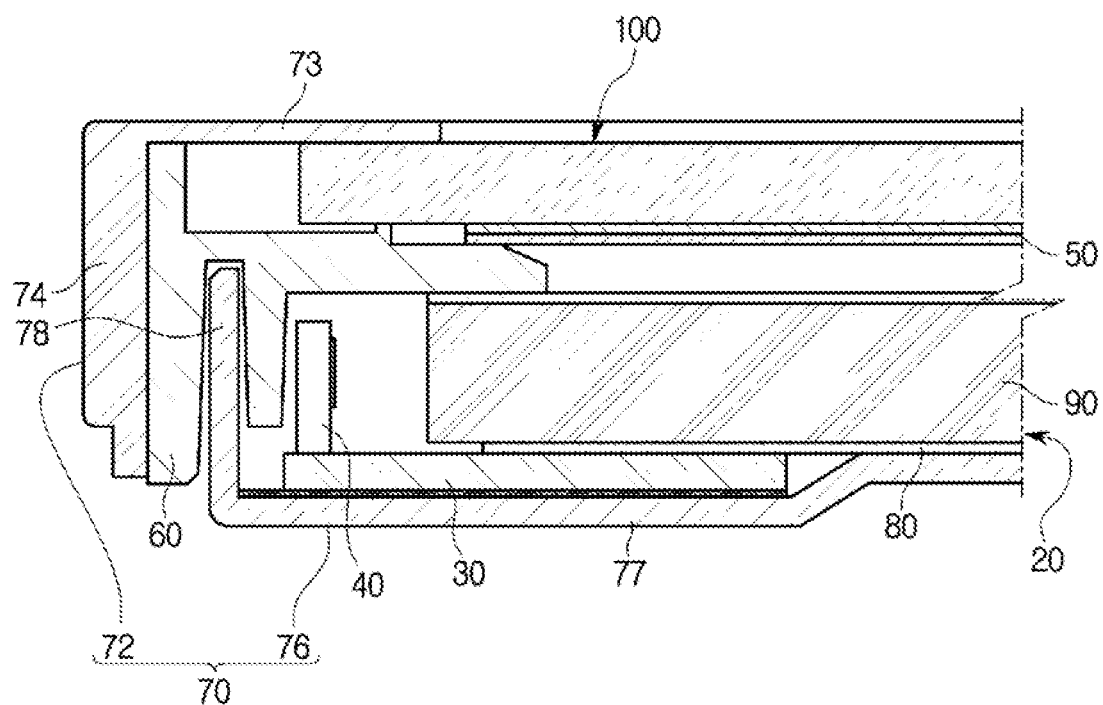
FIG. 2 is a cross-sectional view of a display apparatus according to an embodiment.

FIG. 1 is a perspective view of a display apparatus according to an embodiment, and FIG. 2 is a cross-sectional view of a display apparatus according to an embodiment.

The following description will be given under an assumption that the display apparatus is a flat panel display apparatus. However, embodiments are not limited thereto and the display apparatus may be a curved display apparatus having a screen of a fixed curvature, or a bendable or flexible display apparatus capable of changing the curvature of the screen.

A display apparatus 1 may include a display module for displaying images.

The display module may include a display panel 100 on which images are displayed, and a backlight unit 20 for supplying light to the display panel 100. The backlight unit 20 may include a printed circuit board (PCB) 30, a light source module 40, a light guide plate 90, and an optical sheet 50. That is, the backlight unit 20 may include the light source module 40 disposed behind the display panel 100, the light guide plate 90 disposed between the display panel 100 and the light source module 40 to diffuse light supplied from the light source module 40 and to transmit the light to the display panel 100, and the optical sheet 50 disposed between the display panel 100 and the light source module 40 to change optical properties. The display apparatus 1 may include a middle mold 60 for supporting the display panel 100, and a display chassis 70 for forming an outer appearance of the display apparatus 1. The display chassis 70 may include a front chassis 72 coupled with a front portion of the middle mold 60 to maintain a state in which the display panel 100 is installed in the middle mold 60, and a rear chassis 76 coupled with a rear portion of the middle mold 60, wherein the light source module 40 is disposed at both sides of the rear chassis 76.

The light source module 40 may be disposed in front of the rear chassis 76 to radiate light toward the display panel 100. The light source module 40 may include a point light source that emits monochromatic light or white light. The current embodiment relates to a direct type display, however, the current embodiment may also be applied to an edge type display.

The display panel 100 may be disposed between the middle mold 60 and the front chassis 72, and the rear chassis 76 may be disposed behind the middle mold 60. The middle mold 60 may support the above-described components, and maintain the display panel 100 and the rear chassis 76 separated from each other.

The front chassis 72 may include a bezel portion 73 covering the front edge portions of the display panel 100, and a front side portion 74 bent rearward from an end portion of the bezel portion 73 to cover the side surface of the middle mold 60.

The rear chassis 76 may include a rear portion 77 forming a rear portion of the display module, and a bottom side portion 78 extending forward from edges of the rear portion 77 and coupled into the middle mold 60. The rear chassis 76 may be formed in the shape of a polygonal plate having high strength, and the rear chassis 76 may be formed of a metal material (for example, aluminum or an aluminum alloy) having low thermal deformation against heat emitted from the light source 40 and/or the display panel 100. The rear chassis 76 may be molded with a plastic material (for example, Poly Carbonate (PC)). Also, the rear chassis 76 may be molded by adding a glass fiber to a plastic material.

A plurality of light source modules 40 may be mounted on the PCB 30. The size of the PCB 30 may correspond to the size of the display panel 100. The plurality of light source modules 40 may be arranged in a plurality of rows on the PCB 30. A plurality of light source modules 40 may be arranged in a plane on the PCB 30. The light source module 40 will be described in detail later.

The reflective sheet 80 may reflect light emitted from the light source module 40 toward the display panel 100, or light reflected back from the optical sheet 50 or the display panel 100 toward the display panel 100. The reflective sheet 80 may be disposed on the front surface of the PCB 30, and reflect leaking light toward the display panel 100 to improve light efficiency. The reflective sheet 80 may be disposed between the light guide plate 90 and the rear chassis 76. The reflective sheet 80 may be coated with a high reflective white or silver coating (e.g., silver, TiO2). The reflective sheet 80 may include a reflective plate.

The optical sheet 50 may make light radiated from the light source module 40 and moving toward the display panel 100 have uniform brightness. The light of uniform brightness passed through the optical sheet 50 may be incident onto the display panel 100. The optical sheet 50 may include a protective sheet, a prism sheet, or a diffuser sheet. The optical sheet may include at least one sheet.

Figure 3:
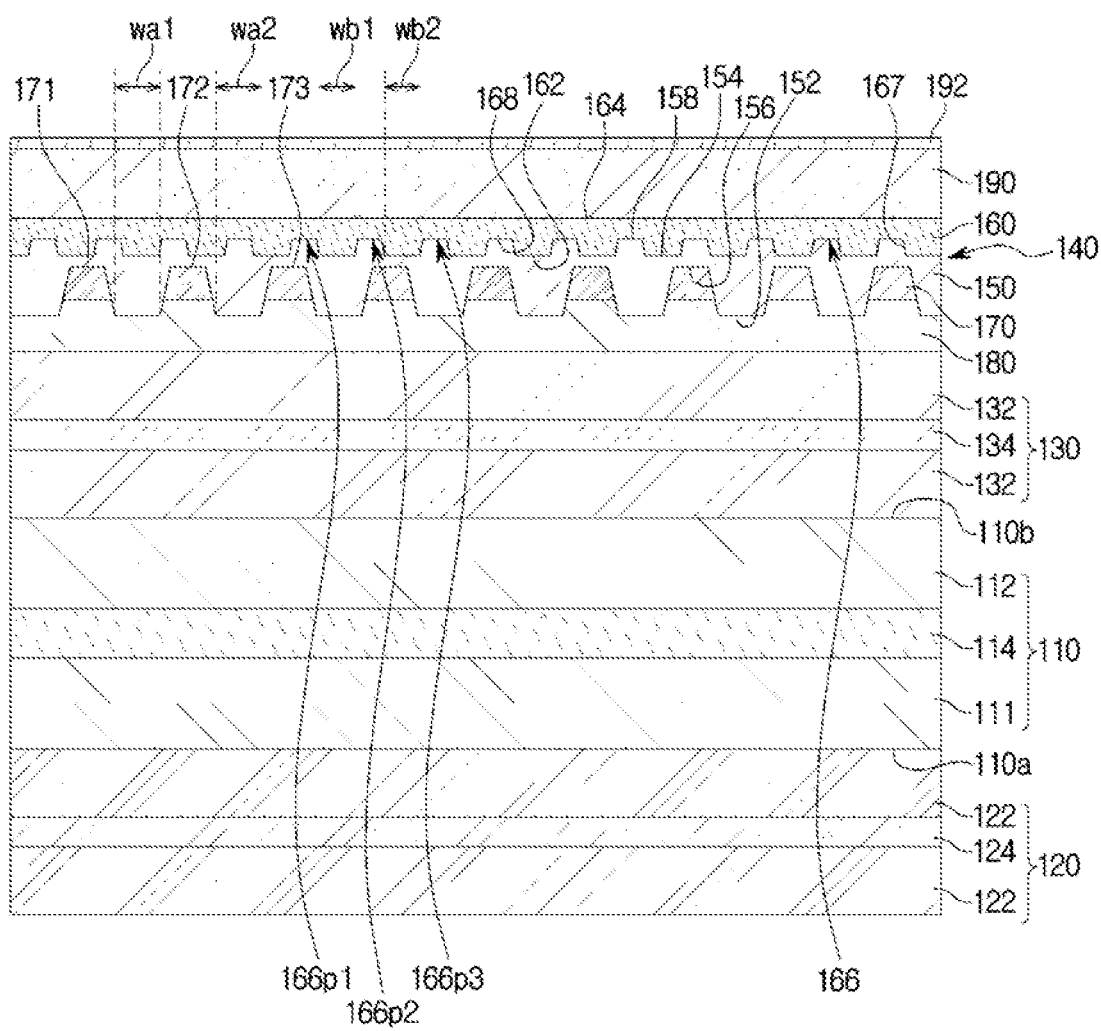
FIG. 3 is a cross-sectional view of a display panel included in a display apparatus according to an embodiment.
Figure 4:
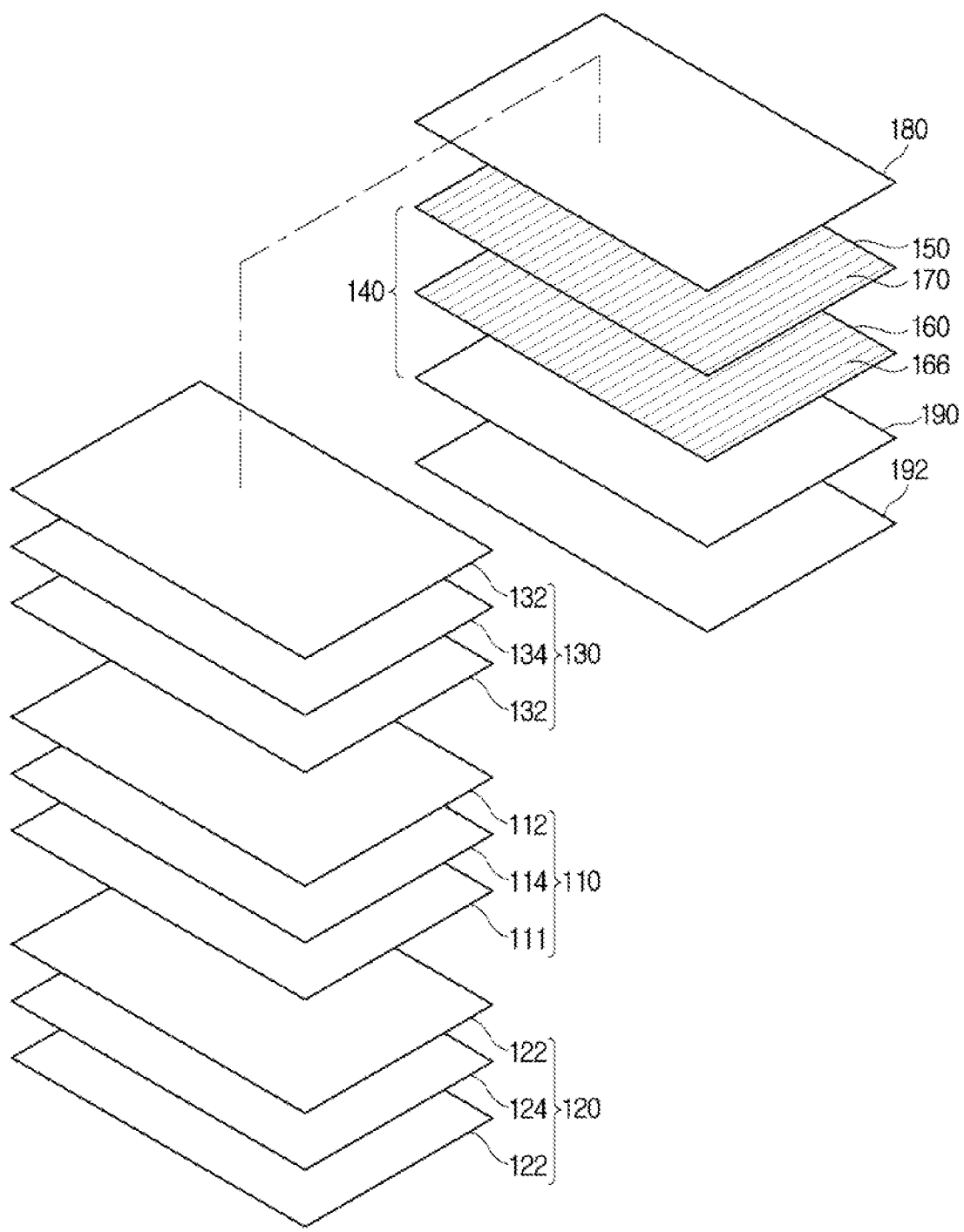
FIG. 4 is an exploded perspective view of a display panel included in a display apparatus according to an embodiment.
Figure 5:
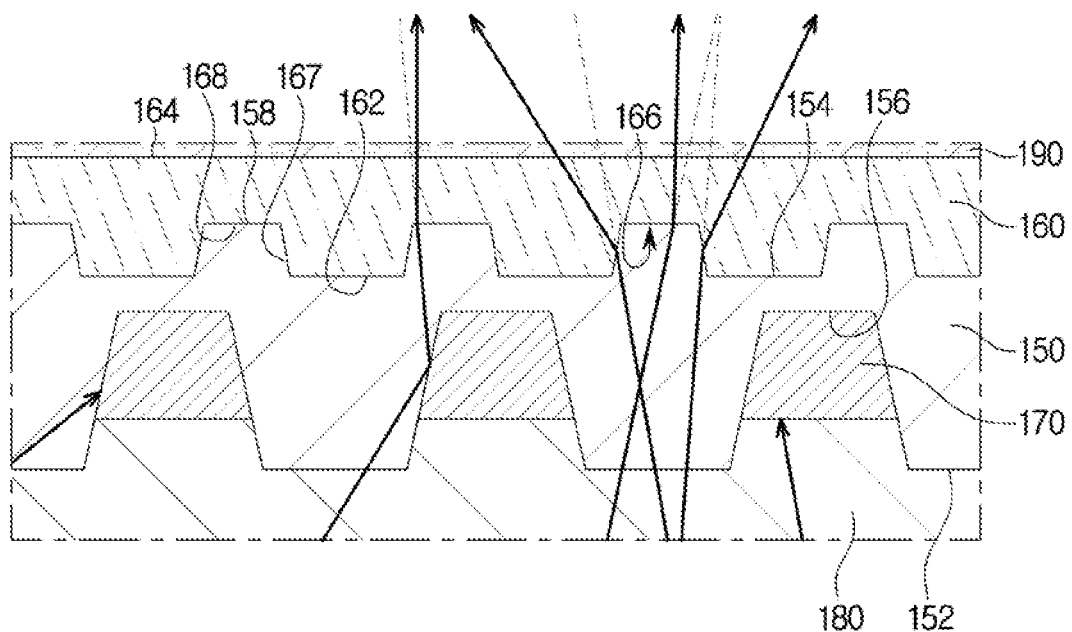
FIG. 5 shows a path of light passing through a portion of a display apparatus according to an embodiment.
Figure 6:
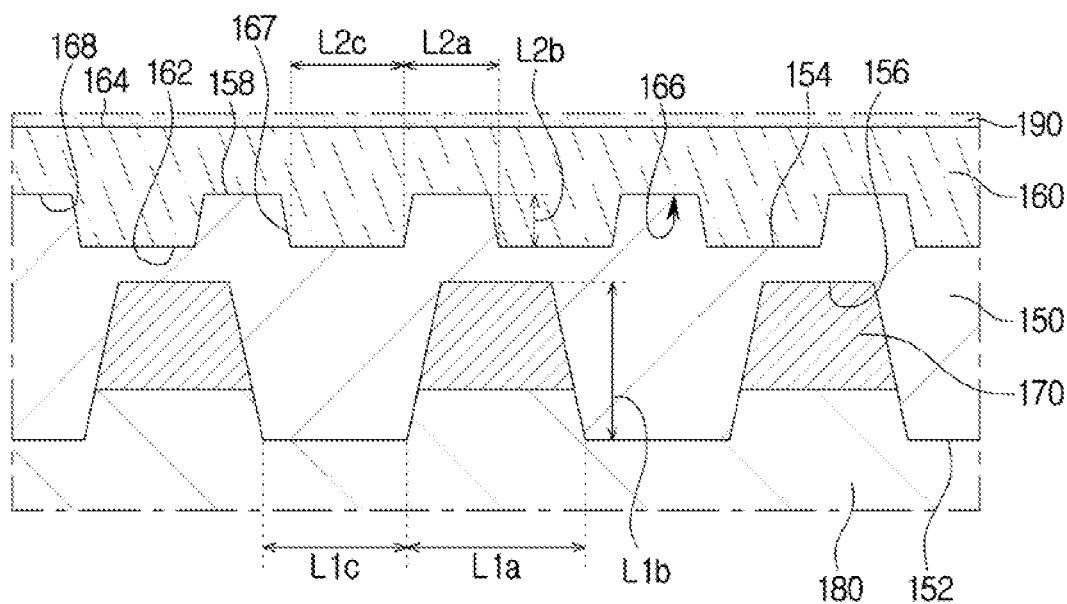
FIG. 6 is a cross-sectional view showing a part of a configuration of a display apparatus according to an embodiment.

FIG. 3 is a cross-sectional view of a display panel included in a display apparatus according to an embodiment, FIG. 4 is an exploded perspective view of a display panel included in a display apparatus according to an embodiment, FIG. 5 shows a path of light passing through a portion of a display apparatus according to an embodiment, and FIG. 6 is a cross-sectional view showing a part of a configuration of a display apparatus according to an embodiment.

The display panel 100 can display an image by converting an electrical signal into an optical signal. The display panel 100 may include a liquid crystal panel 110 and a plurality of polarizers 120 and 130.

A liquid crystal panel 110 may be disposed in front of the backlight unit 20 to block or transmit light emitted from the backlight unit 20 in order to form images.

The front surface of the liquid crystal panel 110 may form the screen of the display apparatus 1 described above, and may be configured with a plurality of pixels. The plurality of pixels included in the liquid crystal panel 110 may independently block or transmit light from the backlight unit 20, and the light transmitted by the plurality of pixels may form an image to be displayed on the display apparatus 1.

The liquid crystal panel 110 may include first and second transparent substrates 111 and 112, and a liquid crystal layer 114. In addition, the liquid crystal panel 110 may include a pixel electrode, a thin film transistor, a common electrode, and a color filter. The first and second transparent substrates 111 and 112 may form an outer appearance of the liquid crystal panel 110, and protect the liquid crystal layer 114 and the color filter installed therebetween. The first and second transparent substrates 111 and 112 may be made of tempered glass or transparent resin.

Liquid crystal means an intermediate state between a solid (crystal) state and a liquid state. When a material in a solid state is heated, the material changes from the solid state to a transparent liquid state at its melting temperature. However, when a liquid crystal material in a solid state is heated, the liquid crystal material changes to an opaque, turbid liquid at its melting temperature, and then changes to a transparent liquid state. Most of liquid crystal materials are organic compounds. A molecule of a liquid crystal material is in the shape of a thin, long rod. Also, the molecular arrangement of the liquid crystal material is irregular when seen in a specific direction, but appears as a regular crystalloid pattern when seen in another direction. Accordingly, the liquid crystal has both the fluidity of a liquid and the optical anisotropy of a solid.

Also, the liquid crystal shows optical properties according to a change of an electric field. For example, a change in an electric field may change the orientation of the molecular arrangement of the liquid crystal.

For example, if an electric field is formed in the liquid crystal layer 114, the liquid crystal molecules of the liquid crystal layer 114 may be arranged in the direction of the electric field, and if no electric field is formed in the liquid crystal layer 114, the liquid crystal molecules may be arranged irregularly or according to an orientation layer.

As a result, the liquid crystal layer 114 may change its optical properties according to existence/absence of an electric field in the liquid crystal layer 114. For example, when no electric field is formed in the liquid crystal layer 114, light polarized by the first polarizing film 124 may pass through the liquid crystal layer 114 and then pass through the second polarizing film 134 due to the arrangement of the liquid crystal molecules in the liquid crystal layer 114. Meanwhile, if an electric field is formed in the liquid crystal layer 114, light polarized by the first polarizing film 124 may not pass through the second polarizing film 134 since the arrangement of the liquid crystal molecules in the liquid crystal layer 114 changes.

The polarizers 120 and 130 may be disposed on the outer surfaces of the first and second transparent substrates 111 and 112.

The polarizers 120 and 130 may include a first polarizer 120 disposed on the outer surface of the first transparent substrate 111 and a second polarizer 130 disposed on the outer surface of the second transparent substrate 112.

The first polarizer 120 may be in contact with the first surface 110a of the liquid crystal panel 110. The first polarizer 120 may include a first protective film 122 and a first polarizing film 124. A pair of first protective films 122 may be provided to protect front and rear surfaces of the first polarizing film 124. The first protective film 122 may be formed of a material having durability and non-optical properties. The first protective film 122 may include a triacetyl cellulose (TAC) film, polyethylene terephthalate (PET), and acryl.

The first polarizing film 124 may be in contact with the first protective film 122. In the current embodiment, a first polarizing film 124 may be positioned between a pair of first protective films 122. The first polarizing film 124 may include polyvinyl alcohol (PVA). The first polarizing film 124 may include a dichroic material that polarizes light in a specific direction in polyvinyl alcohol.

The second polarizer 130 may be in contact with the second surface 110b of the liquid crystal panel 110. The second polarizer 130 may include a second protective film 132 and a second polarizing film 134. A pair of second protective films 132 may be provided to protect the front and rear sides of the second polarizing film 134. The second protective film 132 may be formed of a material having durability and non-optical characteristics. The second protective film 132 may include triacetyl cellulose (TAC) film, polyethylene terephthalate (PET), and acryl.

The second polarizing film 134 may be in contact with the second protective film 132. In the current embodiment, a second polarizing film 134 may be positioned between the pair of second protective films 132. The second polarizing film 134 may include polyvinyl alcohol (PVA). The second polarizing film 134 may include a dichroic material that polarizes light in a specific direction within the polyvinyl alcohol.

Light may be composed of a pair of an electric field and a magnetic field vibrating in a direction that is perpendicular to the traveling direction. The electric field and the magnetic field may vibrate in all directions that are perpendicular to the traveling direction of the light. A phenomenon in which an electric field or a magnetic field vibrates in a specific direction is called polarization. Also, a film to transmit light including an electric field or a magnetic field vibrating in a predetermined direction and block light including an electric field and a magnetic field vibrating in the other directions is called a polarizing film. In other words, a polarizing film may transmit light vibrating in a predetermined polarizing direction, and block light vibrating in the other directions.

The first polarizing film 124 may transmit light having an electric field and a magnetic field vibrating in the first direction, and block the other light. In addition, the second polarizing film 134 may transmit light having an electric field and a magnetic field vibrating in the second direction, and block the other light. The first direction may be orthogonal to the second direction. In other words, the polarization direction of light transmitted by the first polarizing film 124 may be perpendicular to the vibrating direction of light transmitted by the second polarizing film 134. As a result, in general, light may not pass through the first polarizing film 124 and the second polarizing film 134 at the same time.

The display panel 100 may include an optical layer 140. As shown in FIG. 5, the optical layer 140 may receive light passed through the liquid crystal panel 110 and the polarizers 120 and 130. Light from a light source may pass through the first polarizer 120, the liquid crystal panel 110, and the second polarizer 130, sequentially, and light transmitted through the second polarizer 130 may be incident on the optical layer 140.

The light supplied from the light source may pass through the display panel 100, and the light may be diffused due to differences in refractive index between the internal components of the display panel 100. Due to this phenomenon, a desired color is not expressed due to light leaking from the display panel 100 at a position forming a specific angle from the front direction of the display apparatus. The optical layer 140 may absorb such unnecessary light or reflect the light in the front direction to improve the image quality of the display apparatus. The optical layer 140 may also diffuse light to compensate for an amount of outgoing light that may be reduced due to partial absorption of light.

The optical layer 140 may include a first resin layer 150, a second resin layer 160, a plurality of light absorption portions 170, and a plurality of light diffusion portions (i.e., troughs) 166. The first and second resin layers 150 and 160 may include a transparent resin capable of transmitting light. The first and second resin layers 150 and 160 may have a width corresponding to the width of the second polarizer 130.

The first resin layer 150 may be disposed on a rear surface of the second resin layer 160. The width of the first resin layer 150 may correspond to that of the second resin layer 160. A refractive index of the first resin layer 150 may be smaller than that of the second resin layer 160. The first and second resin layers 150 and 160 may have optical surfaces that are in parallel to the liquid crystal panel 110, so that light tilts forward when travelling from the first resin layer 150 to the second resin layer 160. That is, light may be directed forward as it passes through the first and second resin layers 150 and 160. The difference between the refractive indices (n1, n2) of the first and second resin layers 150 and 160 may be 0.1 or more.

The first resin layer 150 may include a first optical surface 152 facing the second polarizer 130, and a second optical surface 154 that is in contact with the second resin layer 160 and that is opposite to the first optical surface. The first resin layer 150 may include a plurality of concave grooves (i.e., troughs) 156 that are recessed in the first optical surface 152. Each concave groove 156 may have a trapezoidal cross section. However, the cross-sectional shape of the concave grooves 156 is not limited to a trapezoid, and may be, for example, a triangle, a quadrangle, a part of a circle, a semicircle, an oval, or a combination thereof.

The light absorption portions 170 can absorb a part of light passing through the optical layer 140. The light absorption portions 170 may be disposed on the first resin layer 150. More specifically, the light absorbing portions 170 may be disposed in the concave grooves 156 formed in the first optical surface 152 of the first resin layer 150. The light absorption portions 170 may fill the concave spaces formed in the concave grooves 156. In the current embodiment, the concave grooves 156 are filled up with the light absorption portions 170, respectively. However, the concave grooves 156 may be filled with different amounts of the light absorption portions 170, respectively, depending on the type, size, purpose, etc. of the display apparatus. Light inclined by a predetermined angle or more with respect to a front-rear direction among light directed toward the optical layer 140 may be absorbed by the light absorption portions 170.

The concave grooves 156 formed in the first resin layer 150 may be formed in the first optical surface 152, and the light absorption portions 170 may be disposed in the concave grooves 156. However, the concave grooves 156 may be formed in the second optical surface 154, and the light absorption portions 170 may be disposed in the concave grooves 156 formed in the second optical surface 154. The light absorption portions 170 may be disposed in the first resin layer 150 without being exposed on the first and second optical surfaces 152 and 154. That is, the light absorption portions 170 may be disposed in any location of the first resin layer 150 as long as it can absorb a part of light passing through the optical layer 140.

A length in the front-rear direction of the light absorption portions 170 may be longer than the width in the left-right direction. Thereby, the light absorption portions 170 may efficiently absorb light inclined at a predetermined angle or more with respect to the front surface of the display apparatus 1 among light incident to the optical layer 140. Also, light incident to the optical layer 140 through the light absorption portions 170 may be directed toward the front surface of the display apparatus 1.

As shown in FIG. 4, the light absorption portions 170 may extend in one direction on the first resin layer 150, and may be arranged in a direction that is orthogonal to the one direction. In the current embodiment, the light absorption portions 170 may extend in a height direction of the first resin layer 150, and arranged in a width direction of the first resin layer 150. That is, the light absorption portions 170 may extend in the vertical direction of the first resin layer 150, and may be arranged in the horizontal direction of the first resin layer 150. In the current embodiment, the light absorption portions 170 may be distributed uniformly in the first resin layer 150. Thus, the light absorption portions 170 may prevent light tilted more than a specific angle in the left-right direction with respect to a reference axis in the front-rear direction, from being emitted in the left-right direction of the display panel 100.

The concave grooves 156 may also be formed in the first resin layer 150 to correspond to the light absorption portions 170 disposed in the first resin layer 150. That is, the concave grooves 156 may extend in one direction in the first resin layer 150, and may be arranged in a direction that is orthogonal to the one direction. In the current embodiment, the concave grooves 156 may extend in the longitudinal direction of the first resin layer 150, and may be arranged in the transverse direction of the first resin layer 150. That is, the concave grooves 156 may extend in the vertical direction of the first resin layer 150, and may be arranged in the horizontal direction of the first resin layer 150.

The light absorption portions 170 may be distributed uniformly in the first resin layer 150. The light absorption portions 170 may include a first absorption portion 171, a second absorption portion 172 spaced a first distance wa1 from the first absorption portion 171, and a third absorption portion 173 spaced a second distance wa2 from the second absorption portion 172. In the current embodiment, the first distance wa1 may be equal to the second distance wa2. That is, the light absorption portions 170 may be arranged at regular intervals in the first resin layer 150. Light passing through the liquid crystal panel 110 may be absorbed by the light absorption portions 170 arranged at regular intervals, or may pass between the light absorption portions 170 to be transmitted toward the front surface of the display panel 100.

The light absorption portions 170 may include at least one of carbon black, a black resin, a mixture of metal particles, graphite powder, gravure ink, black spray, and black enamel.

The cross-sectional shapes of the light absorption portions 170 may correspond to the cross-sectional shapes of the concave grooves 156. The cross-sections of the light absorption portions 170 and the concave grooves 156 may be formed in a trapezoidal shape with a narrower width at a deeper depth. Referring to FIG. 6, if the width of the cross section of each light absorption portion 170 is L1a, the height of the cross section is L1b, and the interval between the light absorption portions 170 is L1c, the following equations may be satisfied.

$$5\mu m \leq L1a \leq 20\mu m$$

$$10\mu m \leq L1b \leq 40\mu m$$

$$15\mu m \leq L1c \leq 50\mu m$$

In the current embodiment, L1a, L1b, and L1c correspond to the case in which the cross-sectional shape of the light absorption portions 170 is a trapezoid. However, the light absorption portions 170 may have any other shape as long as the equations are satisfied. In the current embodiment, the width, depth, and spacing of the concave grooves 156 are referred to as L1a, L1b, and L1c, respectively, for convenience of description. However, if the light absorption portions 170 are partially filled in the concave grooves 156, the width, height, and spacing of the light absorption portions 170 are referred to as L1a, L1b, and L1c, respectively.

The light diffusion portions 166 may diffuse light not absorbed by the light absorption portions 170. The light diffusion portions 166 may diffuse light to prevent the brightness of light that is emitted to the display panel 100 from being reduced due to light absorption by the light absorption portion 170. The light diffusion portions 166 may be disposed in the second resin layer 160. In detail, the light diffusion portions 166 may form one surface of the second resin layer 160. The light diffusion portions 166 may diffuse light incident at a certain angle or less that has not been absorbed by the light absorption portion 170.

The light diffusion portions 166 may include a diffusion surface 167.

The diffusion surface 167 may be tilted with respect to the first optical surface 162 facing the first resin layer 150 in the second resin layer 160. The first optical surface 162 of the second resin layer 160 may be formed as a flat surface facing the first resin layer 150. The diffusion surface 167 may be tilted with respect to the first optical surface 162 to refract light incident to the diffusion surface 167 to be further tilted from the reference axis in the front-rear direction. The diffusion surface 167 may be further tilted than the first optical surface 162 to further increase the slope of light passing through the diffusion surface 167 among light incident to the second resin layer 160 from the first resin layer 150.

The light diffusion portions 166 may include a concave optical surface 168.

The concave optical surface 168 may be stepped from the first optical surface 162 of the second resin layer 160. The concave optical surface 168 may be in parallel to the first optical surface 162 of the second resin layer 160. The concave optical surface 168 may be connected to the diffusion surface 167 extending obliquely from the first optical surface 162. Light incident upon the concave optical surface 168 may be more inclined forward; that is, the light incident upon the concave optical surface 168 may be transmitted by the concave optical surface at a reduced angle with respect to the reference axis in the front-rear direction.

The light diffusion portions 166 may be formed on the first optical surface 162 of the second resin layer 160, and may have a concave and convex cross section. The cross-sectional shape of each light diffusion portion 166 may be a trapezoid with a narrower width at a deeper depth. If it is assumed that the width of the cross section of the light diffusion portion 166 is L2a, the height of the cross section is L2b, and the spacing between the light diffusion portions 166 is L2c, the following equations may be satisfied.

$$5\mu m \leq L2a \leq 10\mu m$$

$$1\mu m \leq L2b \leq 10\mu m$$

$$5\mu m \leq L2c \leq 20\mu m$$

In the current embodiment, L2a, L2b, and L2c correspond to the case in which the light diffusion portions 166 have a trapezoidal cross-sectional shape. However, the light diffusion portions 166 may have any other shape as long as the equations are satisfied.

The first resin layer 150 may include a plurality of protrusion portions 158 facing the second resin layer 160. The protrusion portions 158 may be disposed on the second optical surface 154 facing the second resin layer 160 in the first resin layer 150. The light diffusion portions 166 of the second resin layer 160 may be recessed from the first optical surface 162 of the second resin layer 160 to form a concave space. The protrusion portions 158 may be inserted into the concave space formed by the light diffusion portions 166. In the current embodiment, the protrusion portions 158 may be parts of the first resin layer 150, and may be formed with the same refractive index as the first resin layer 150. Additionally, a refractive index np of the protrusion portions 158 may be greater than or equal to a refractive index n1 of the first resin layer 150, and smaller than a refractive index n2 of the second resin layer 160. That is, $n1 \leq np < n2$ may be satisfied.

The light diffusion portions 166 may extend in a first direction in the second resin layer 160, and arranged in a second direction that is orthogonal to the first direction, as shown in FIG. 4. In the current embodiment, the light diffusion portions 166 may extend in the vertical direction of the second resin layer 160, and may be arranged in the horizontal direction.

The direction in which the light absorption portions 170 and the light diffusion portions 166 are formed and the direction in which the light absorption portions 170 and the light diffusion portions are arranged may be the same. As described above, the light absorption portions 170 and the light diffusion portions 166 may extend in the same first direction, and arranged in the second direction that is orthogonal to the first direction. However, the light absorption portions 170 may extend in any other direction that is different from the first direction, and may be arranged in a direction that is orthogonal to the direction in which light absorption portions 170 are formed.

The light diffusion portions 166 may be uniformly distributed in the second resin layer 160. The light diffusion portions 166 may include a first diffusion portion 166p1, a second diffusion portion 166p2 spaced a first distance wb1 apart from the first diffusion portion 166p1 by a first distance wb1, and a third diffusion portion 166p3 spaced a second distance wb2 apart from the second diffusion portion 166p2. In the current embodiment, the first distance wb1 may be identical to the second distance wb2. That is, the light diffusion portions 166 may be spaced apart from the second resin layer 160 at regular intervals. With this configuration, the light diffusion portions 166 may enable the display panel 100 to have uniform luminance over the entire area.

Light passing through the liquid crystal panel 110 may be absorbed or reflected by the light absorption portions 170 spaced apart by a predetermined distance so that only light inclined at a predetermined angle or less with respect to the reference axis in the front-rear direction may be emitted. Thereafter, light passing through the first resin layer 150 may be diffused by the light diffusion portions 166, thereby reducing deterioration in brightness of images.

The display panel 100 may include an adhesive layer 180.

The adhesive layer 180 may be disposed between the optical layer 140 and the second polarizer 130. The adhesive layer 180 may adhere the optical layer 140 to the second polarizer 130. The adhesive layer 180 may have a refractive index that is equal to or smaller than that of the first resin layer 150. That is, the adhesive layer 180 may have a refractive index that is equal to or smaller than that of the first resin layer 150 such that an exit angle of light emitted from the second polarizer 130 does not increase by the adhesive layer 180.

The display panel 100 may include a protective film 190 disposed on the outer surface of the optical layer 140. The protective film 190 may be in contact with the outer surface of the second resin layer 160 of the optical layer 140. The protective film 190 may include triacetyl cellulose (TAC) film, PET, and acryl. The display panel 100 may include a surface layer 192 disposed on the outer surface of the protective film 190.

The optical layer 140 can be fabricated as a single module, and then bonded to the polarizer. That is, the first and second polarizers 120 and 130 and the liquid crystal panel 110 may be manufactured separately from the optical layer 140, and then combined with the optical layer 140.

The light diffusion portions 166 may be formed on the rear surface of the second resin layer 160. Then, the first resin layer 150 may be stacked on the rear surface of the second resin layer 160. The protrusion portions 158 of the first resin layer 150 may be injected or inserted into the light diffusion portions 166. A concave groove 156 may then be formed in the first resin layer 150, and a light absorption portion 170 may be injected or inserted into the concave groove 156. The optical layer 140 manufactured through the method may be adhered to one surface of the second polarizer 130 through the adhesive layer 180.

The protective film 190 or the surface layer 192 disposed on the outer surface of the optical layer 140 may be stacked on the upper surface of the optical layer 140 after the optical layer 140 is bonded to the second polarizer 130. However, the protective film 190 or the surface layer 192 may form the bottom surface of the second resin layer 160, if the optical layer 140 is manufactured as a single module.

Figure 7:
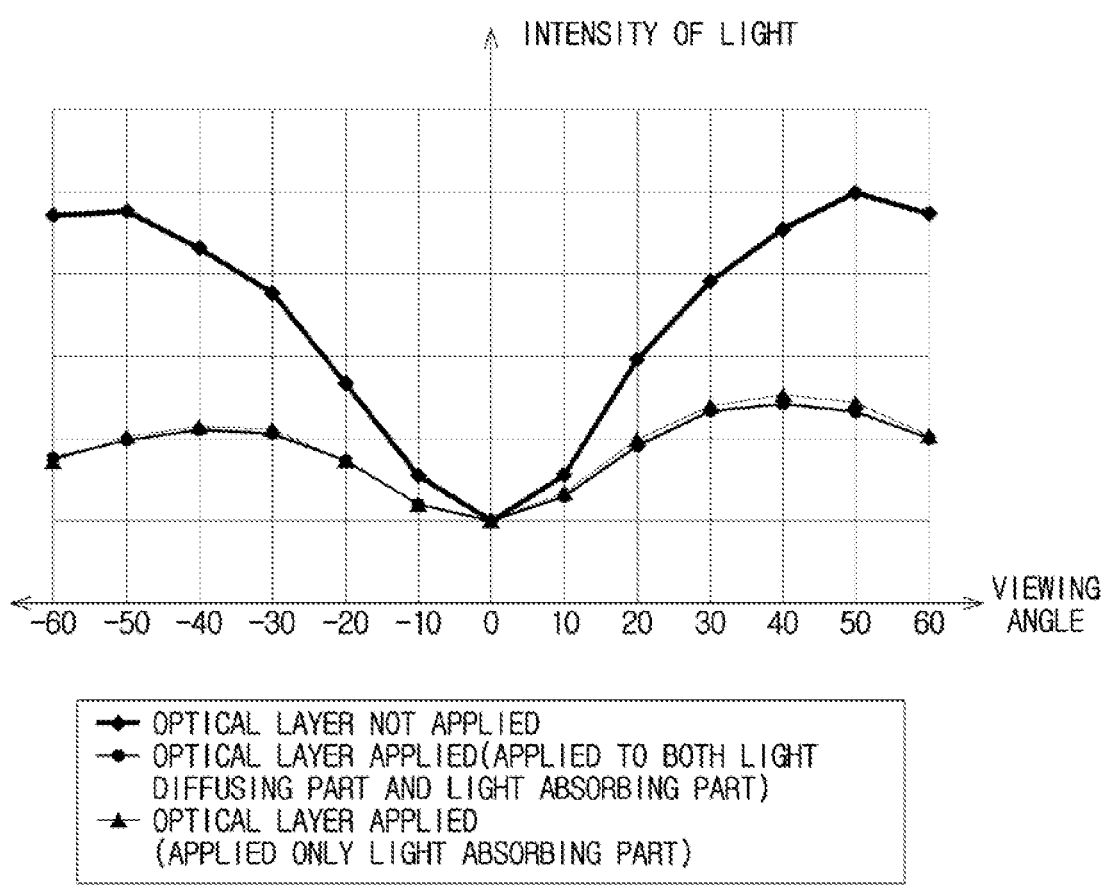
FIGS. 7 and 8 are graphs showing intensities of light according to viewing angles in a display apparatus according to an embodiment.
Figure 8:
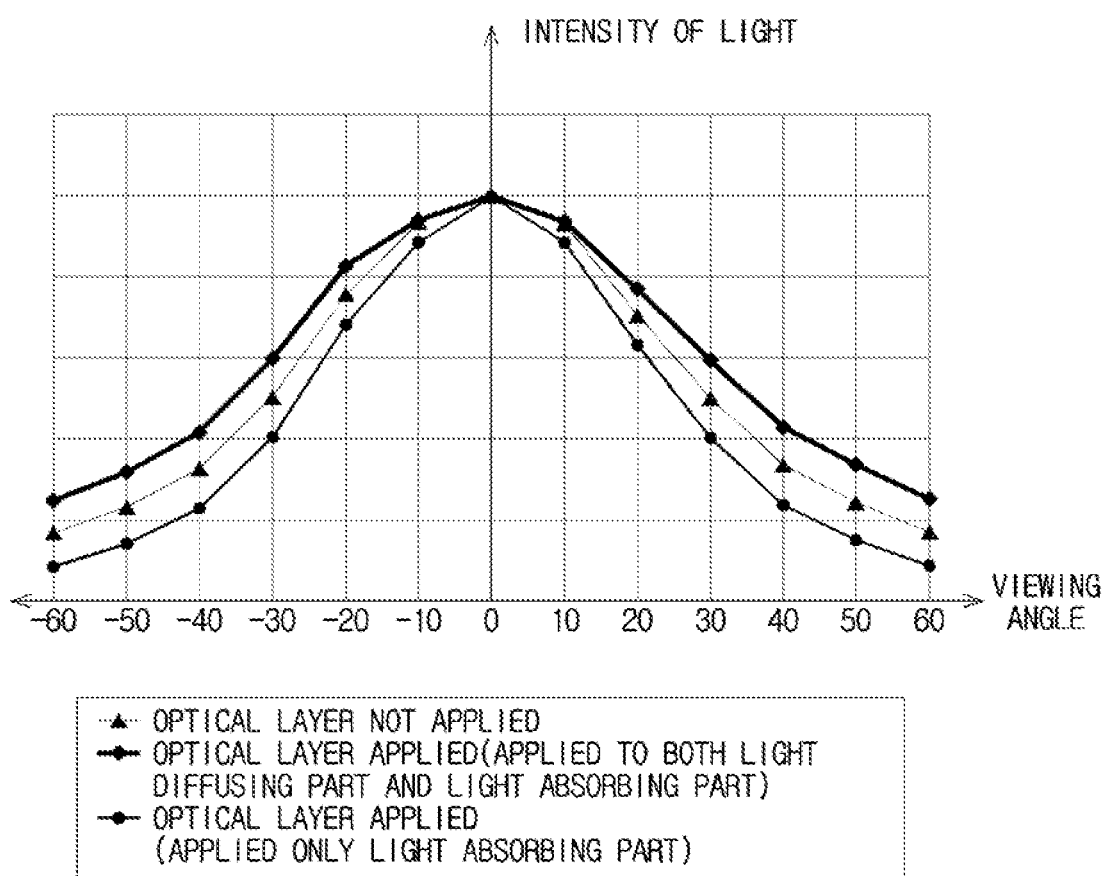

FIGS. 7 and 8 are graphs showing intensities of light according to viewing angles in a display apparatus according to an embodiment.

FIG. 7 is a graph illustrating the intensity of light passing through the backlight unit 20 and the display panel 100 according to left and right viewing angles, when a screen of the display panel is black.

As shown in FIG. 7, when the screen of the display panel 100 is black, a larger amount of light may leak at a greater viewing angle with respect to the front surface of the display apparatus 1. In the case in which the optical layer 140 according to the present disclosure is applied, light may be partially absorbed by the light absorption portion 170, compared to the case in which the optical layer 140 is not applied, and accordingly, it may be possible to reduce light leakage according to right and left viewing angles.

FIG. 8 is a graph showing a phenomenon that luminance passing through the backlight unit 20 and the display panel 100 decreases according to right and left viewing angles, when the screen of the display panel is not black.

As shown in FIG. 8, light emitted through the display panel 100 may be partially absorbed by the light absorption portion 170, and accordingly, the brightness of the emitted light may be reduced. That is, when only the light absorption portion 170 is applied, the intensity of light emitted from the display panel 100 may be reduced as shown in FIG. 8. Inclusion of the light diffusion portion 166 in addition to the light absorption portion 170 may improve brightness of the display panel 100.

Hereinafter, a display apparatus according to another embodiment will be described. Hereinafter, descriptions about the same components as those described above will be omitted.

Figure 9:
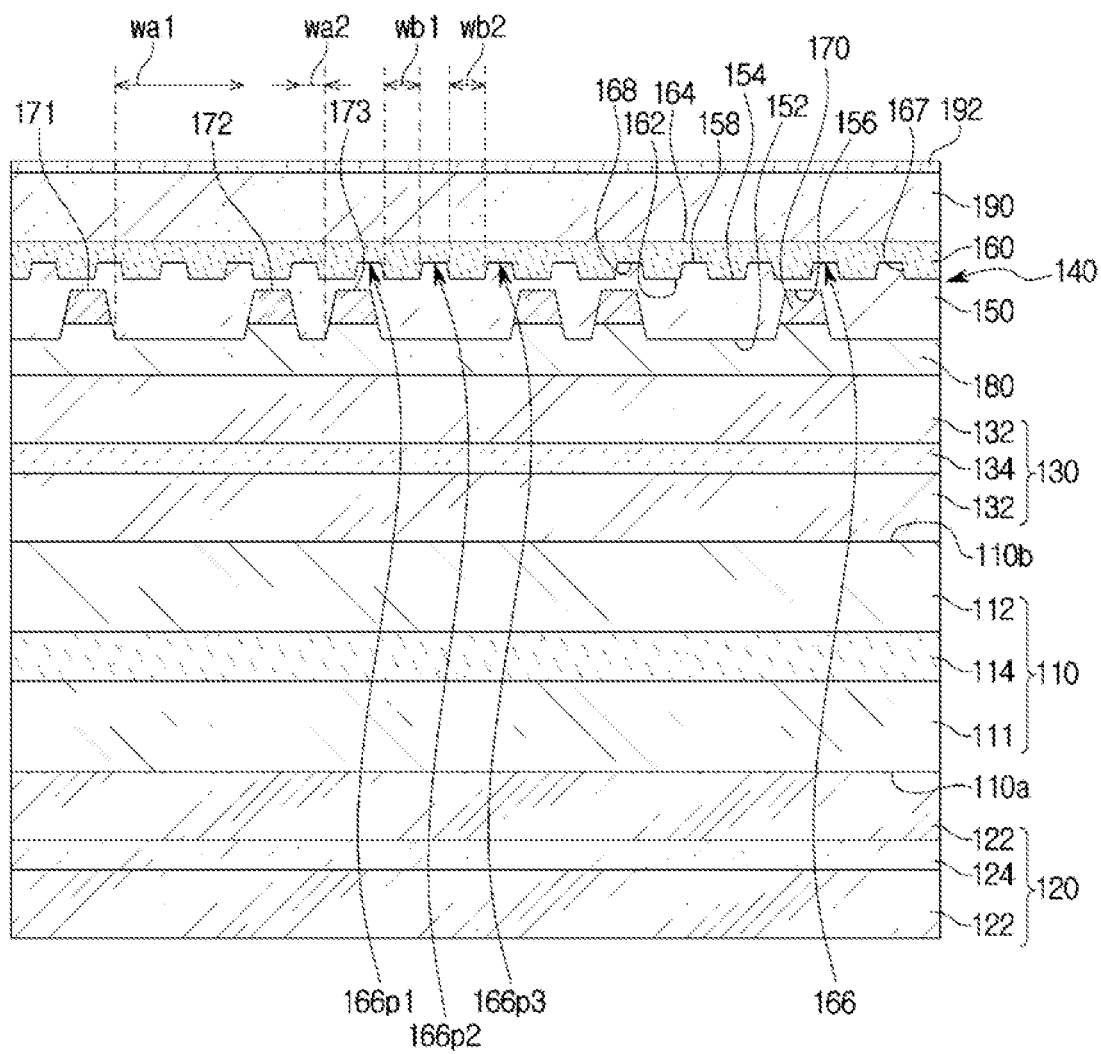
FIGS. 9 to 11 are sectional views of a display panel included in a display apparatus according to another embodiment.
Figure 10:
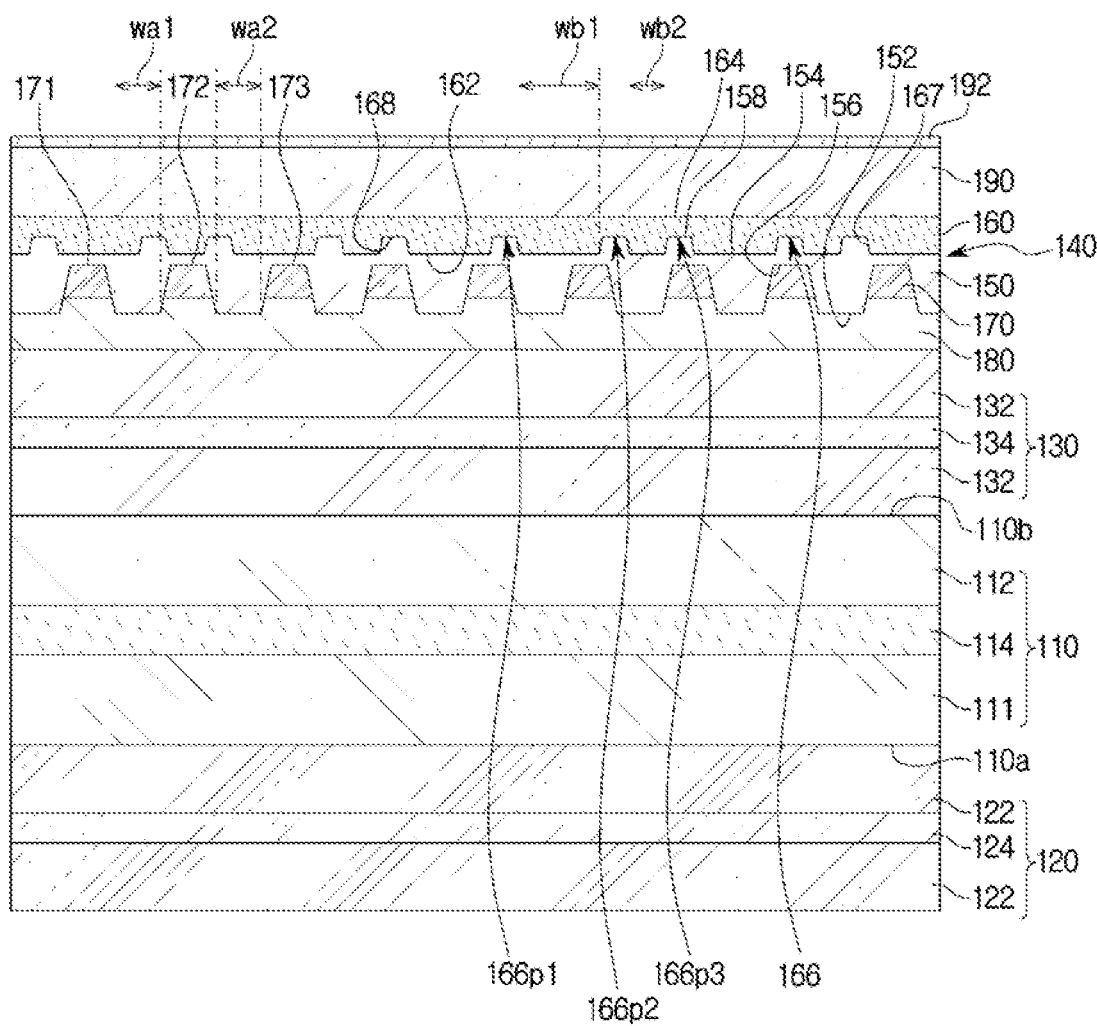
Figure 11:
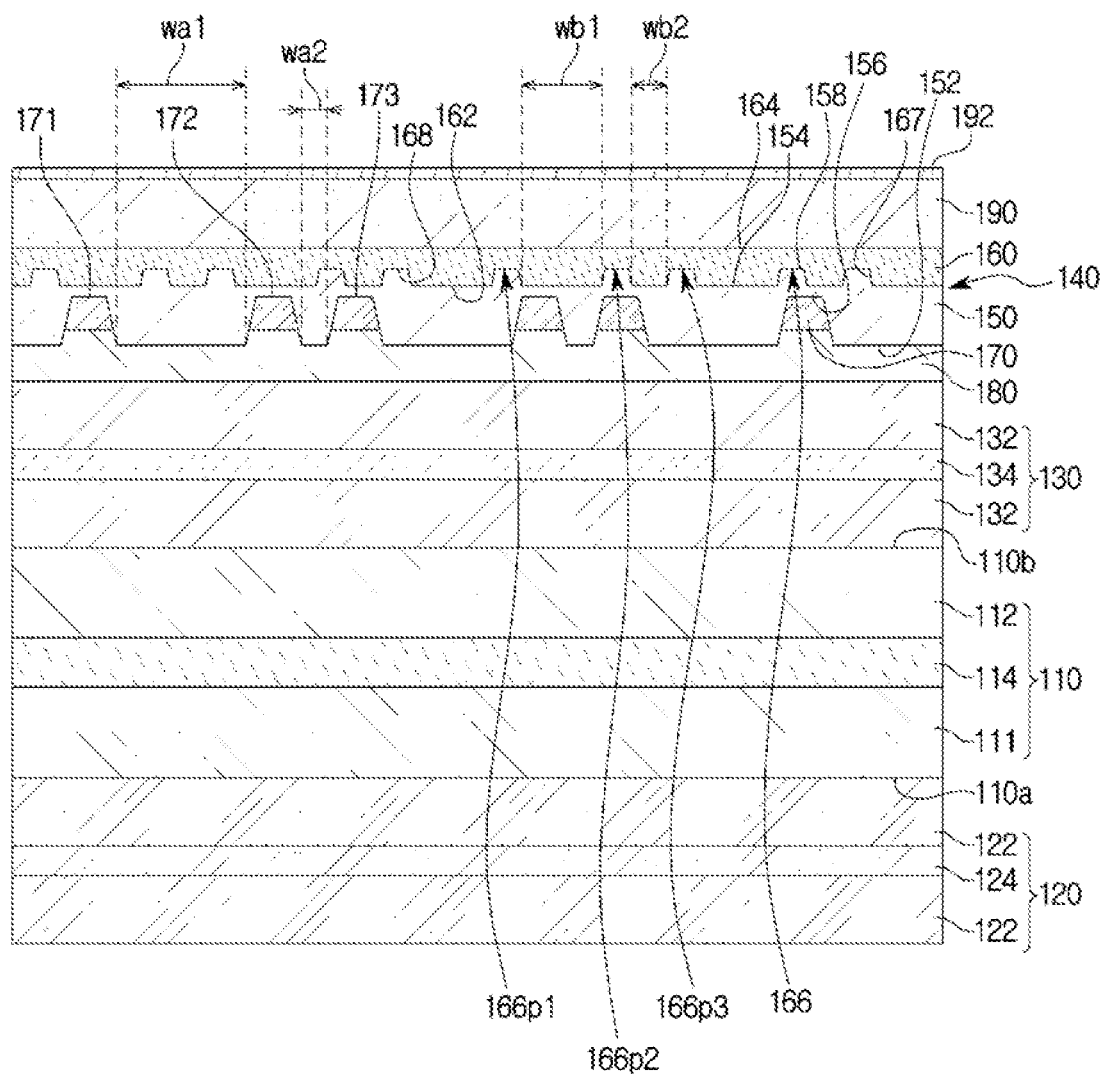

FIGS. 9 to 11 are sectional views of a display panel included in a display apparatus according to another embodiment.

The light absorption portions 170 may include a first absorption portion 171, a second absorption portion 172 spaced a first distance wa1 apart from the first absorption portion 171, and a third absorption portion 173 spaced a second distance wa2 apart from the second absorption portion 172.

The light diffusion portions 166 may include a first diffusion portion 166p1, a second diffusion portion 166p2 spaced a first distance wb1 apart from the first diffusion portion 166p1, and a third diffusion portion 166p3 spaced a second distance wb2 apart from the second diffusion portion 166p2.

As shown in FIG. 9, the first and second distances wa1 and wa2 of the light absorption portions 170 may be different from each other, and the first and second distances wb1 and wb2 of the light diffusion portions 166 may be equal to each other. That is, the light absorption portions 170 may be arranged at different intervals, and the light diffusion portions 166 may be uniformly arranged at equal intervals.

Also, as shown in FIG. 10, the first and second distances wa1 and wa2 of the light absorption portions 170 may be equal to each other, and the first and second distances wb1 and wb2 of the light diffusion portions 166 may be different from each other. That is, the light diffusion portions 166 may be arranged at different intervals, and the light absorption portions 170 may be uniformly arranged at equal intervals.

Also, as shown in FIG. 11, the first and second distances wa1 and wa2 of the light absorption portions 170 may be different from each other, and the first and second distances wb1 and wb2 of the light diffusion portions 166 may also be different from each other. That is, the light diffusion portions 166 and the light absorption portions 170 may be arranged at different intervals.

The spacing between the light absorption portions 170 and the light diffusion portions 166 may vary depending on the arrangement of light sources, the optical sheet, or the internal configuration of the display panel 100.

Hereinafter, a display apparatus according to another embodiment will be described. Hereinafter, descriptions about the same components as those described above will be omitted.

FIGS. 12 to 16 show a shape of a light diffusion portion included in a display apparatus according to another embodiment.

Figure 12:
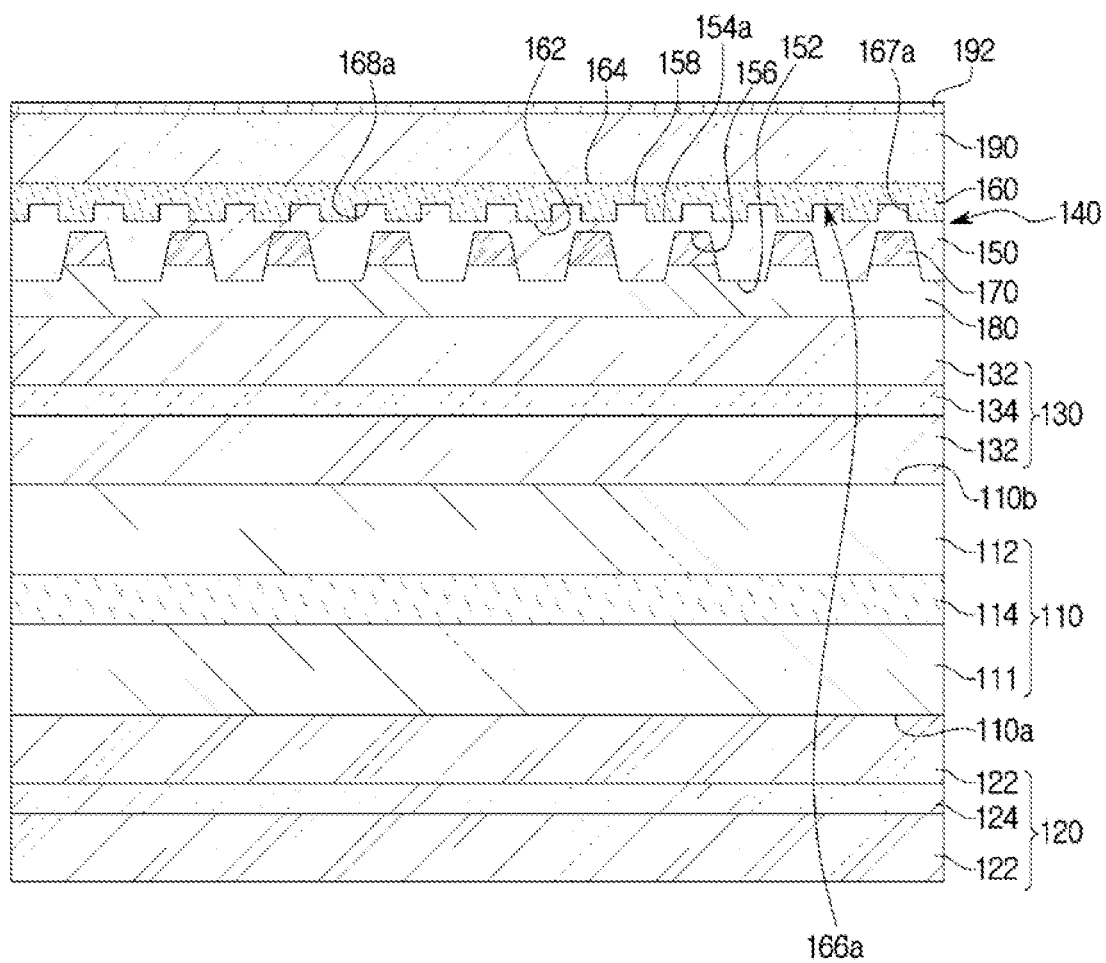
FIGS. 12 to 16 show a shape of a light diffusion portion included in a display apparatus according to another embodiment.

As shown in FIG. 12, the light diffusion portion 166a may be in the shape of a rectangle. That is, the diffusion surface 167a may be formed at a right angle to the first optical surface 162 of the second resin layer 160. The concave optical surface 168a may be stepped from the first optical surface 162 of the second resin layer 160.

Figure 13:
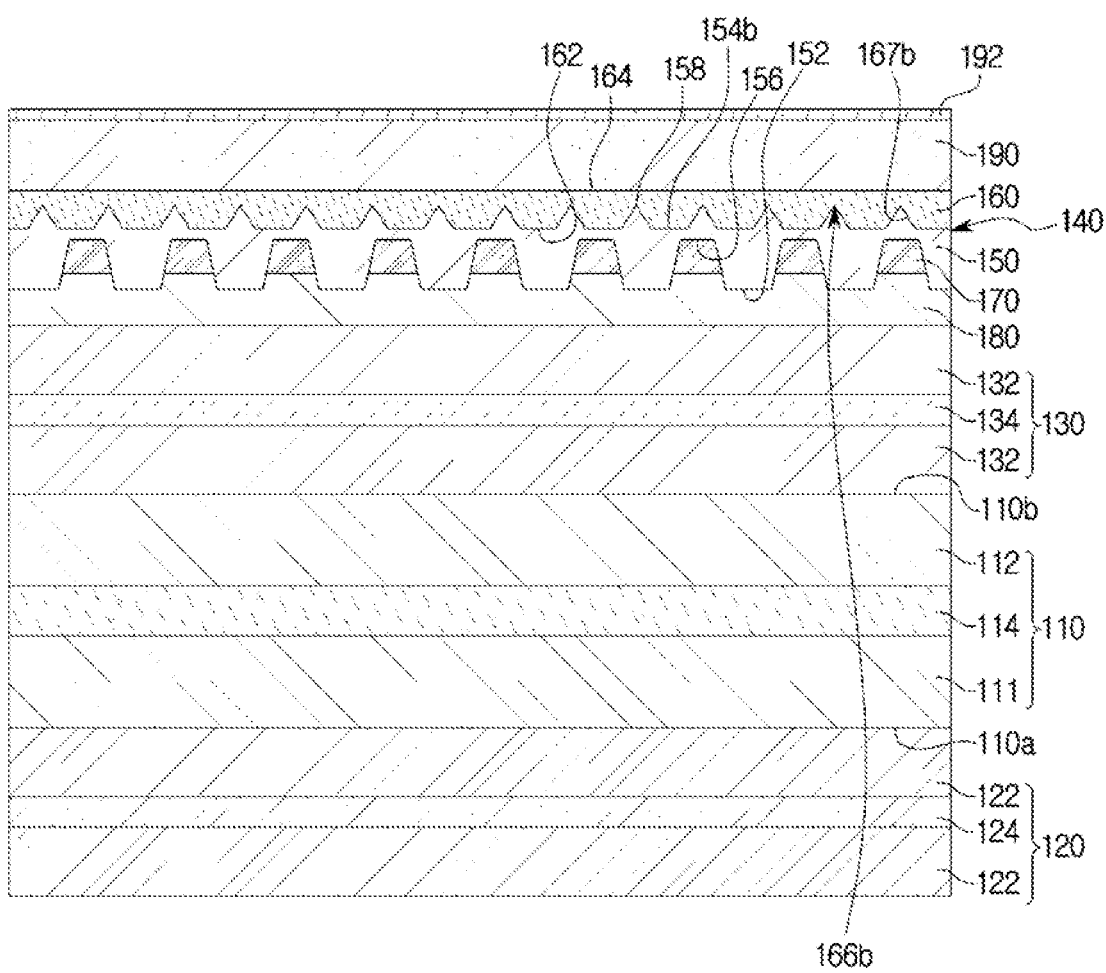

As shown in FIG. 13, the light diffusion portion 166b may be in the shape of a triangle. That is, the diffusion surface 167b may be formed as a plane forming an obtuse angle to the first optical surface 162 of the second resin layer 160. The light diffusion portion 166b may be a diffusion surface 167b.

Figure 14:
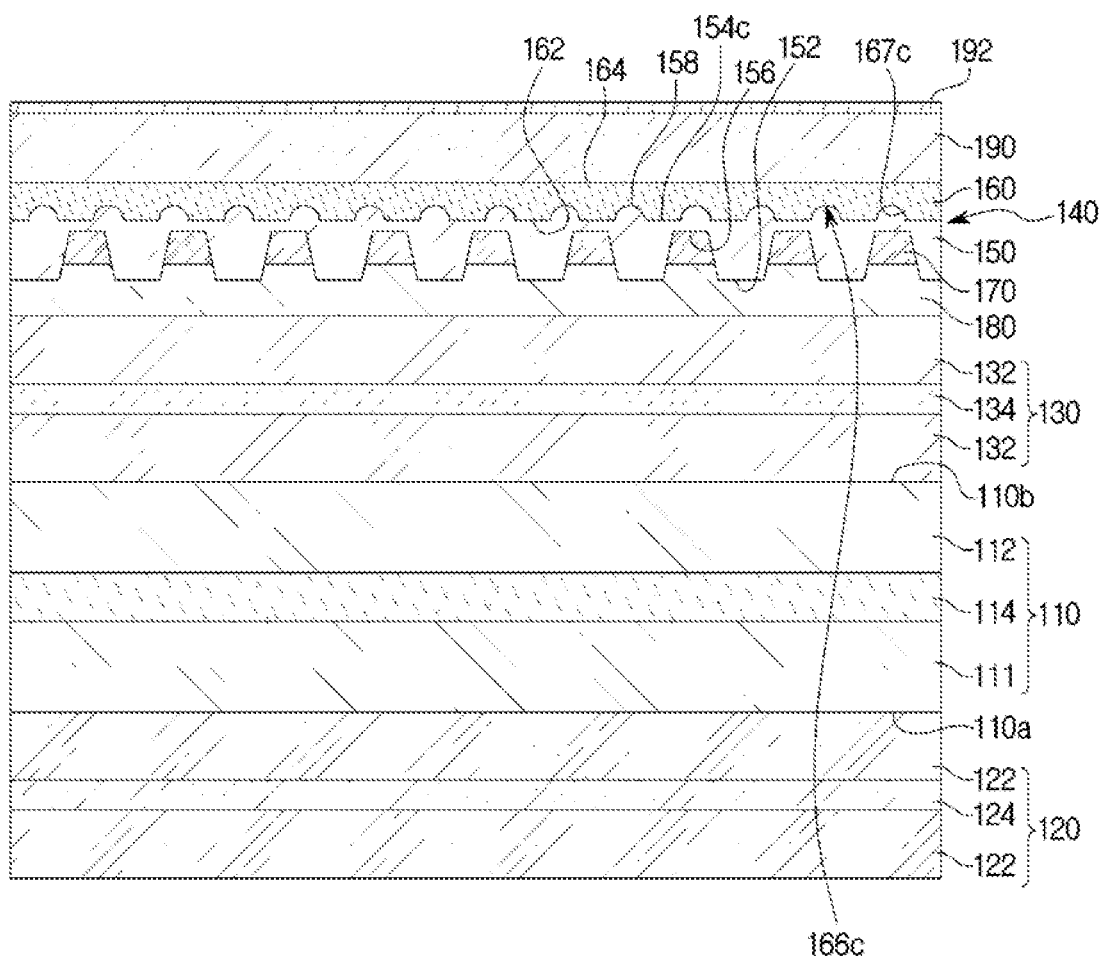
Figure 15:
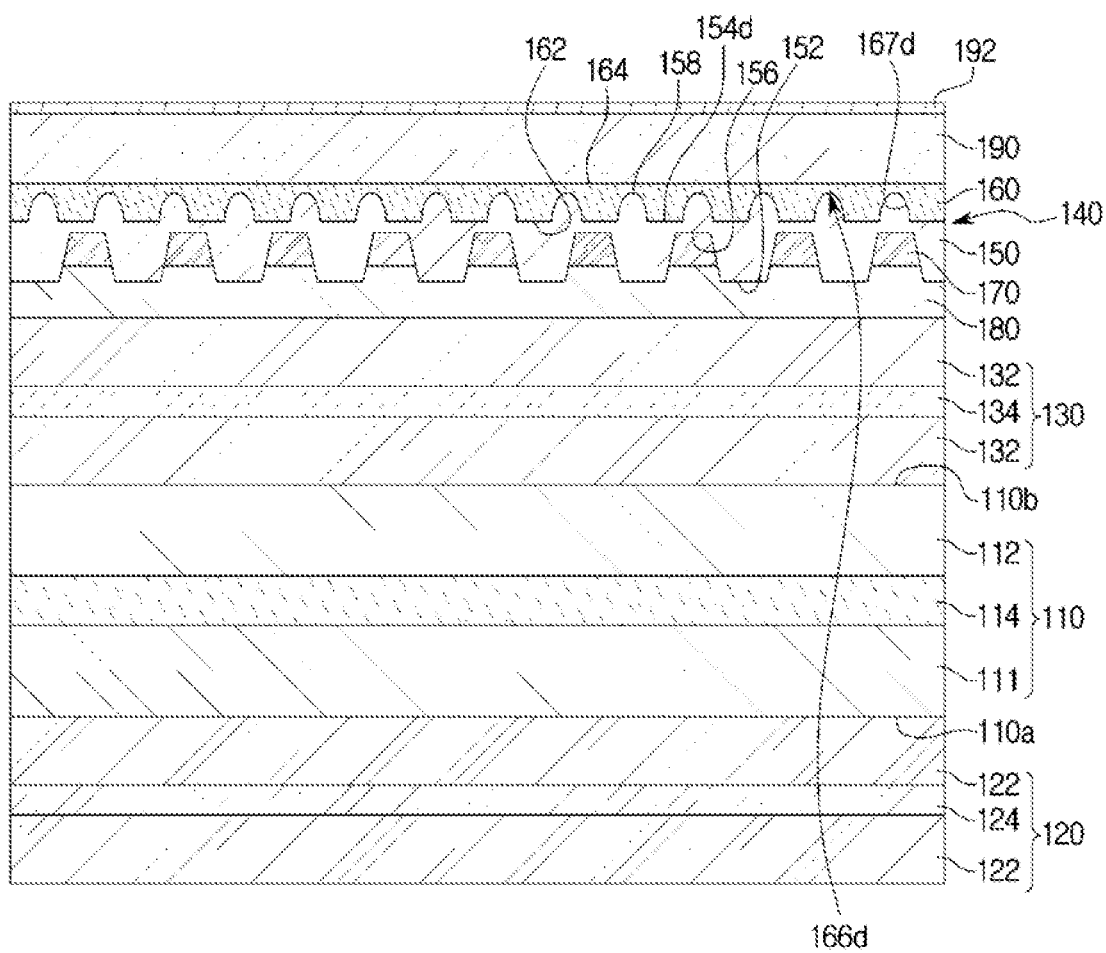

The light diffusion portions 166c and 166d may be formed in the shape of a semi-circle 166c, as shown in FIG. 14, or in the shape of an oval 166d, as shown in FIG. 15. That is, the diffusion surfaces 167c and 167d may form a curved surface. Accordingly, a refraction angle of light may change according to a portion of the light diffusion portions 166c and 166d upon which the light is incident.

Figure 16:
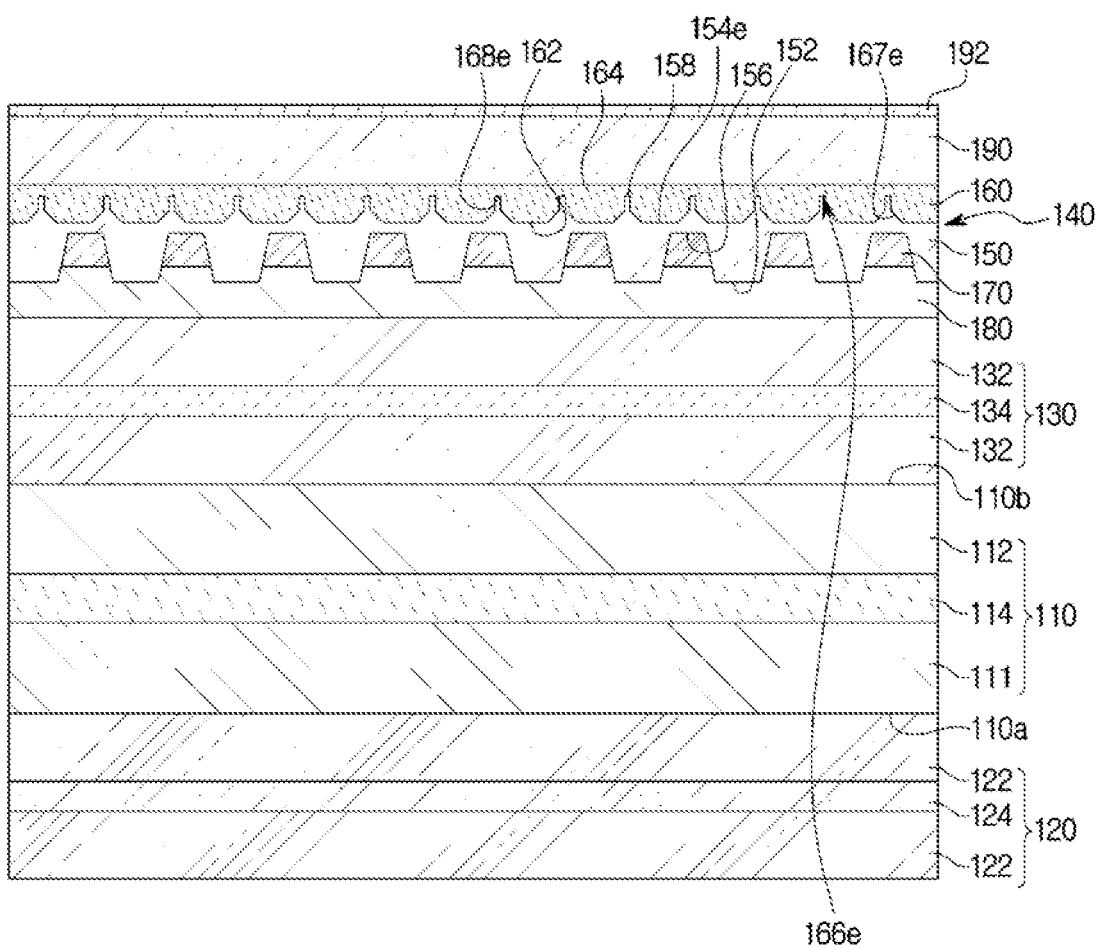

The light diffusion portion 166e may be formed as a combination of the shapes described above as shown in FIG. 16. In FIG. 16, the light diffusion portion 166e may be formed as a combination of a triangle and a square. The diffusion surface 167e may be inclined at different angles to the first optical surface 162, depending on the depth of the second resin layer 160 from the first optical surface 162. Accordingly, a refraction angle of light may change according to a portion of the light diffusion portion 166 upon which the light is incident. The concave optical surface 168e may be stepped from the first optical surface 162 of the second resin layer 160.

Hereinafter, a display apparatus according to another embodiment will be described. Hereinafter, descriptions about the same components as those described above will be omitted.

FIGS. 17 to 21 show a shape of a light absorption portion included in a display apparatus according to another embodiment.

Figure 17:
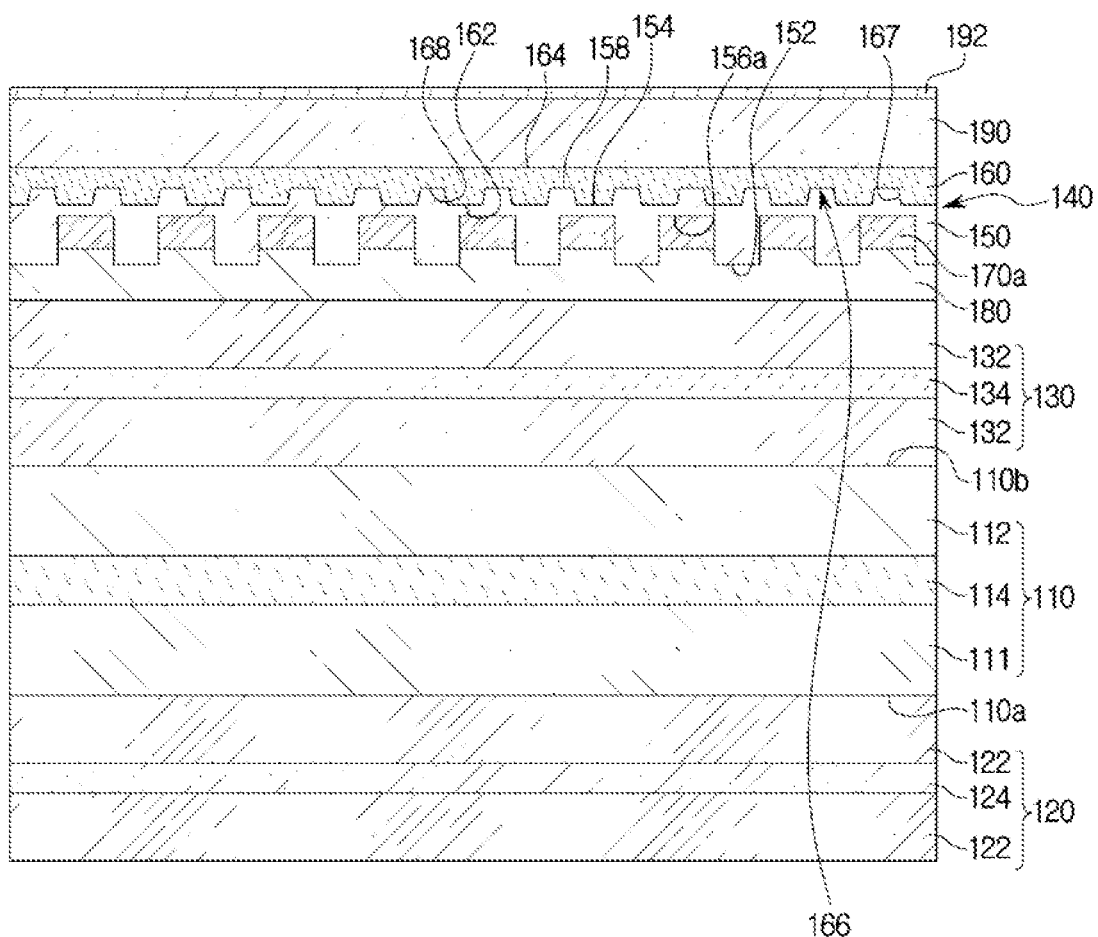
FIGS. 17 to 21 show a shape of a light absorption portion included in a display apparatus according to another embodiment.

As shown in FIG. 17, the first resin layer 150 may include a concave groove 156a formed in a concave shape. The concave groove 156a may be in the shape of a rectangle. Accordingly, the shape of the light absorption portion 170a filled in the concave space formed by the concave groove 156a may be in the shape of a rectangle.

Figure 18:
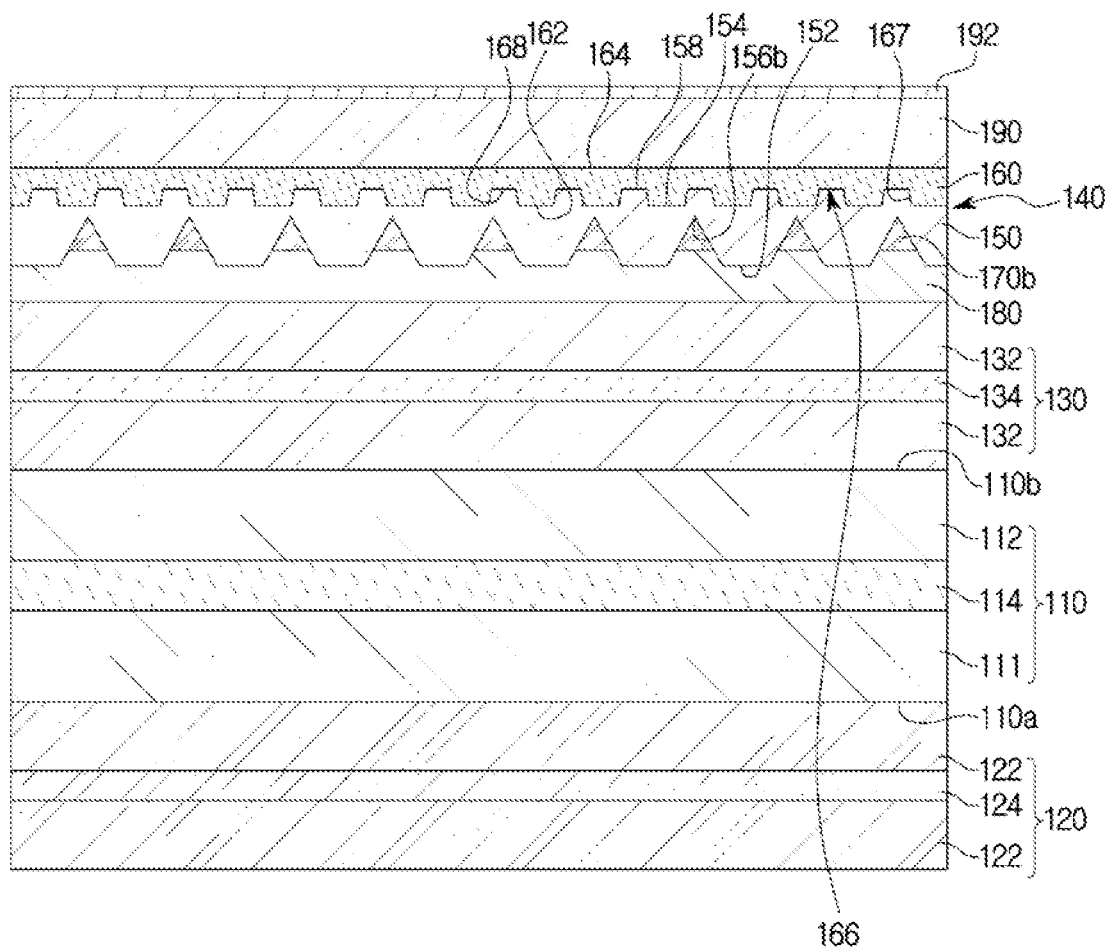

As shown in FIG. 18, the concave groove 156b may be formed in the shape of a triangle. Accordingly, the shape of the light absorption portion 170b filled in the concave space formed by the concave groove 156b may also be in the shape of a triangle.

Figure 19:
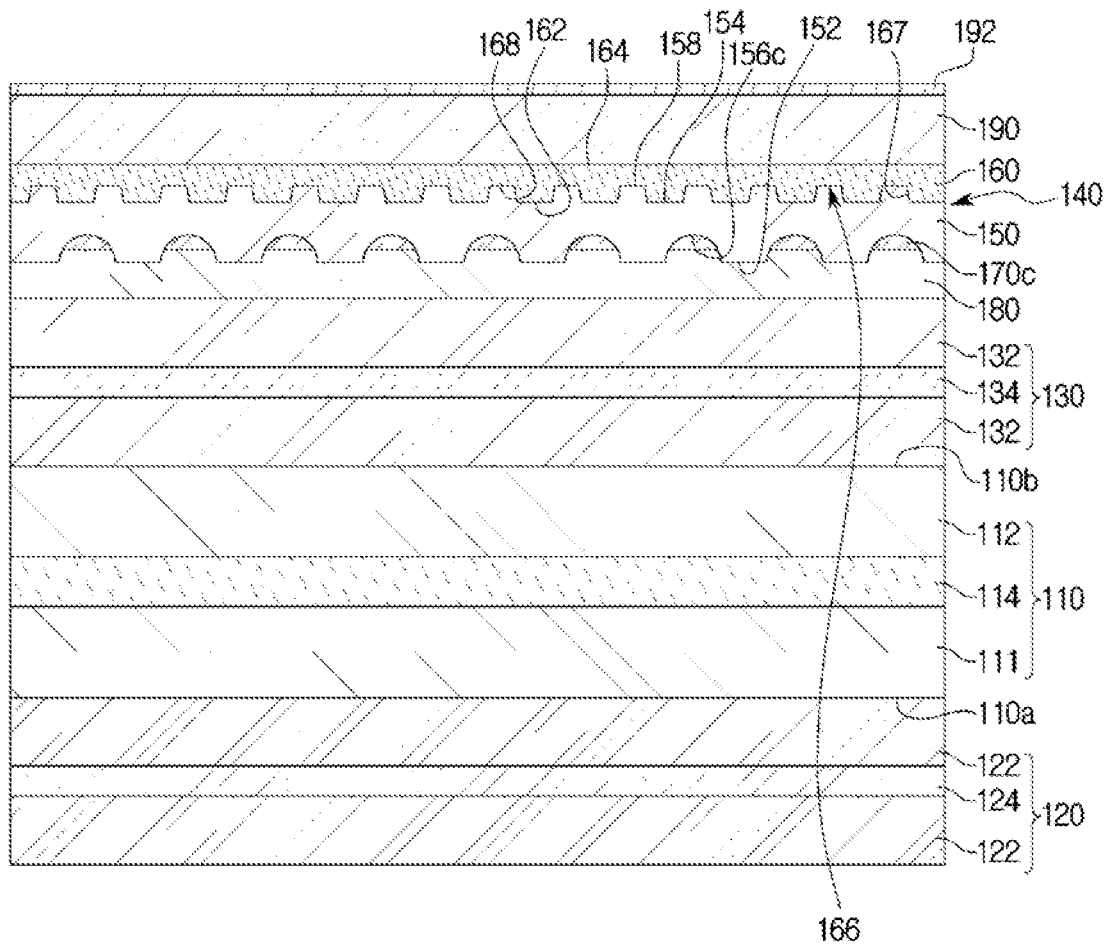

As shown in FIG. 19, the concave groove 156c may be formed in the shape of a semi-circle. Accordingly, the shape of the light absorption portion 170c filled in the concave space formed by the concave groove 156c may also be in the shape of a semi-circle.

Figure 20:
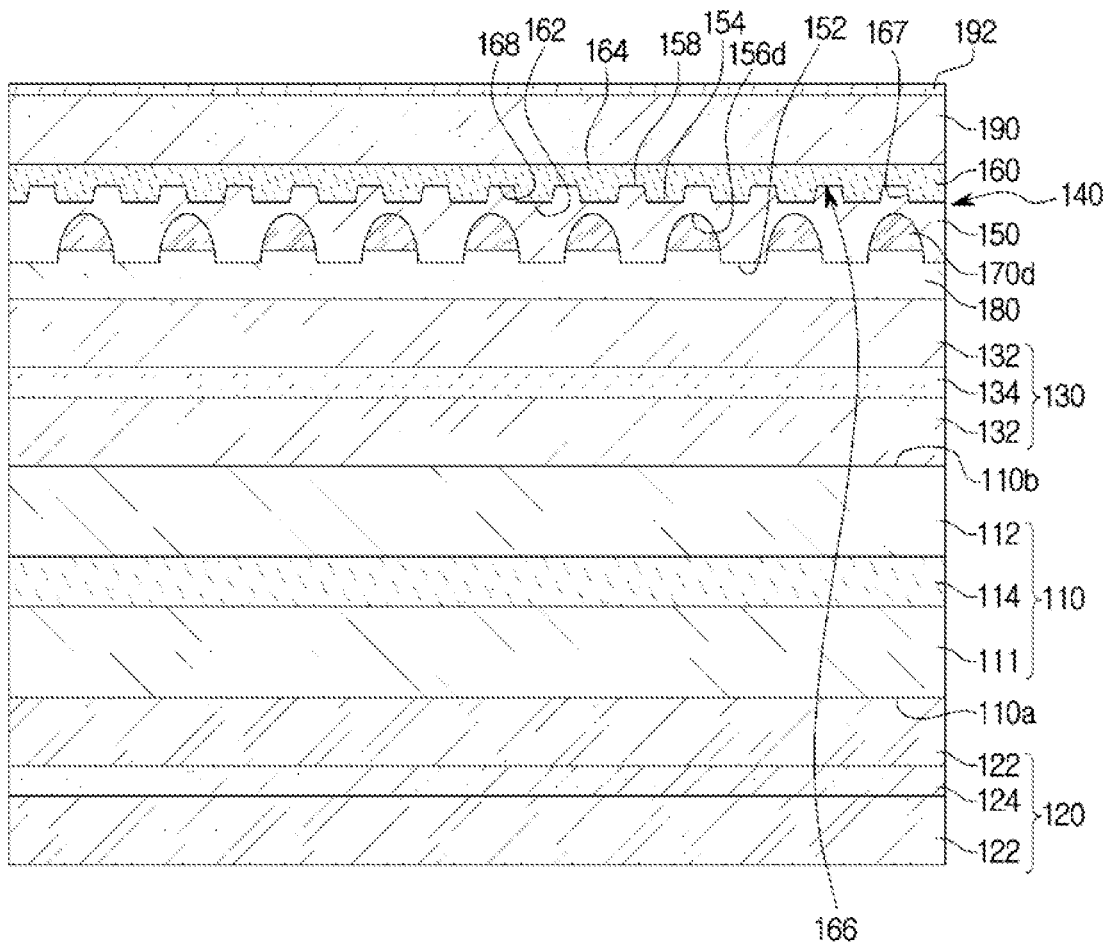

As shown in FIG. 20, the concave groove 156d may be formed in the shape of an oval. Accordingly, the shape of the light absorption portion 170d filled in the concave space formed by the concave groove 156d may also be in the shape of an oval.

Figure 21:
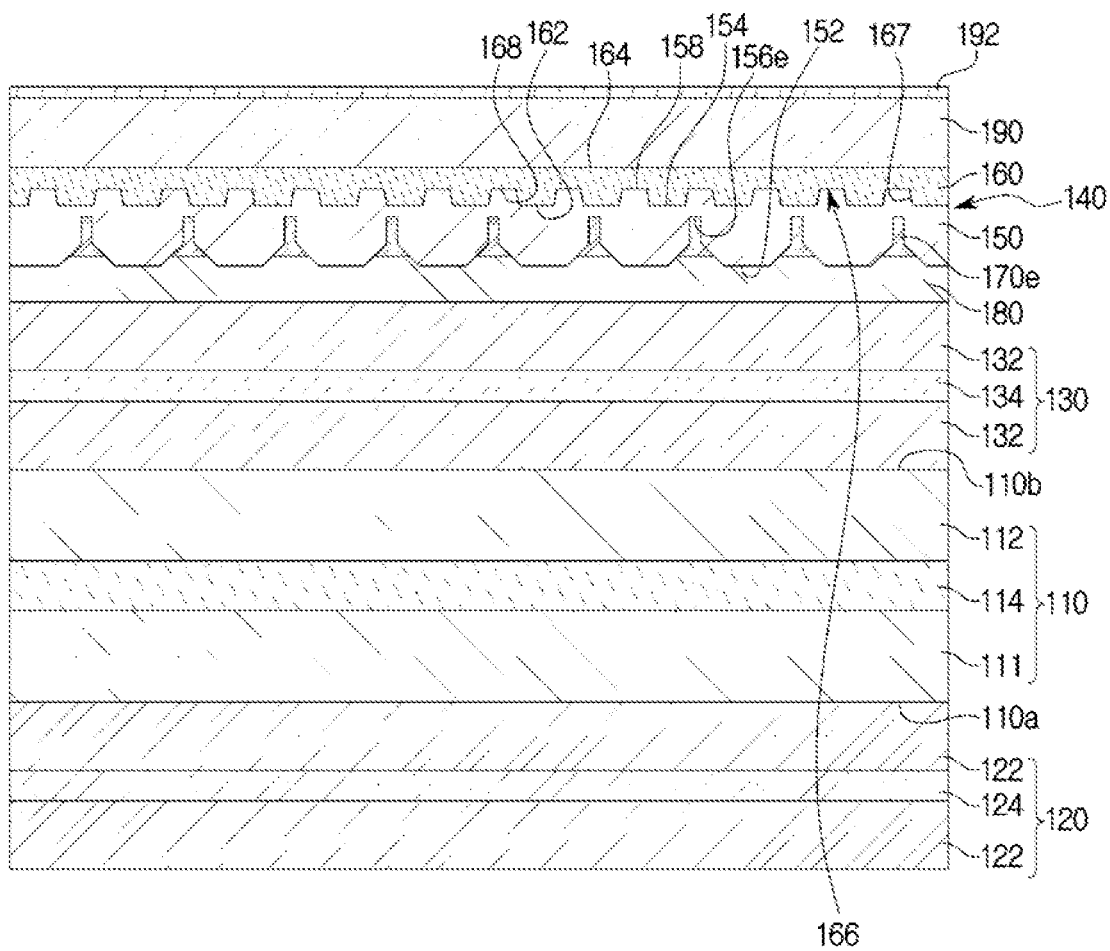

As shown in FIG. 21, the concave groove 156e may be formed as a combination of the shapes described above. In FIG. 21, the concave groove 156e may be formed as a combination of a triangle and a rectangle. Accordingly, the shape of the light absorption portion 170e filled in the concave space formed by the concave groove 156e may also be formed as a combination of a triangle and a square.

Hereinafter, a display apparatus according to another embodiment will be described. Hereinafter, descriptions about the same components as those described above will be omitted.

FIGS. 22 to 27 show various patterns of a light diffusion portion included in a display apparatus according to another embodiment.

Figure 22:
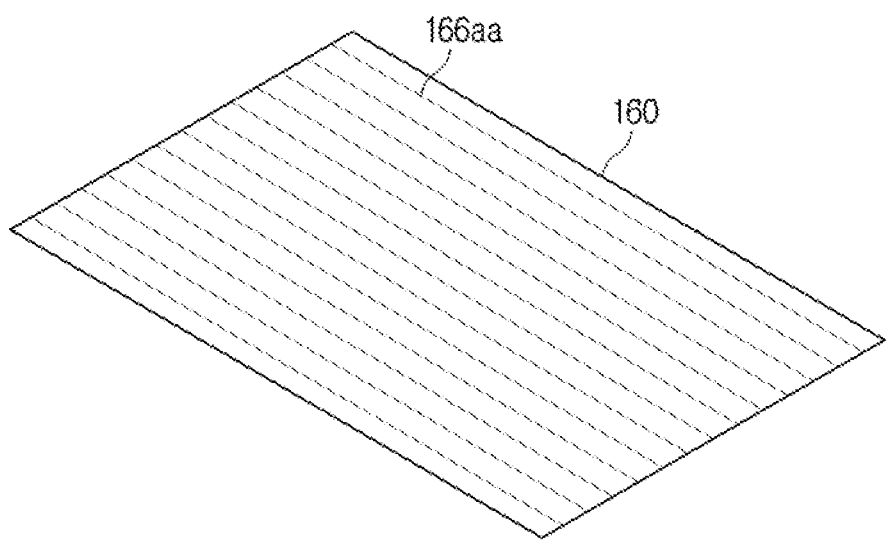
FIGS. 22 to 27 show various patterns of a light diffusion portion included in a display apparatus according to another embodiment.

The light diffusion portions 166aa may be arranged in the second resin layer 160. The light diffusion portions 166aa may extend in the horizontal direction of the display panel 100 as shown in FIG. 22, and may be arranged in the vertical direction of the display panel 100. That is, a plurality of light diffusion portions 166ee may extend in the left-right direction in the second resin layer 160, and may be arranged in the up-down direction. The light diffusion portions 166aa may be uniformly distributed in the second resin layer 160.

Figure 23:
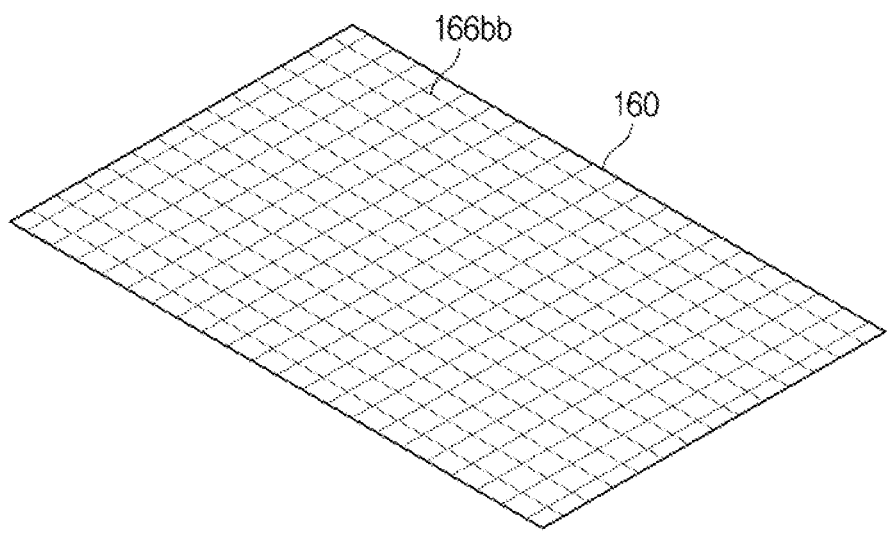

As shown in FIG. 23, the light diffusion portions 166bb may intersect with each other in the horizontal direction and the vertical direction of the display panel 100, respectively, and may be arranged in the vertical direction and the horizontal direction, respectively. The light diffusion portions 166bb may be uniformly distributed in the second resin layer 160.

Figure 24:
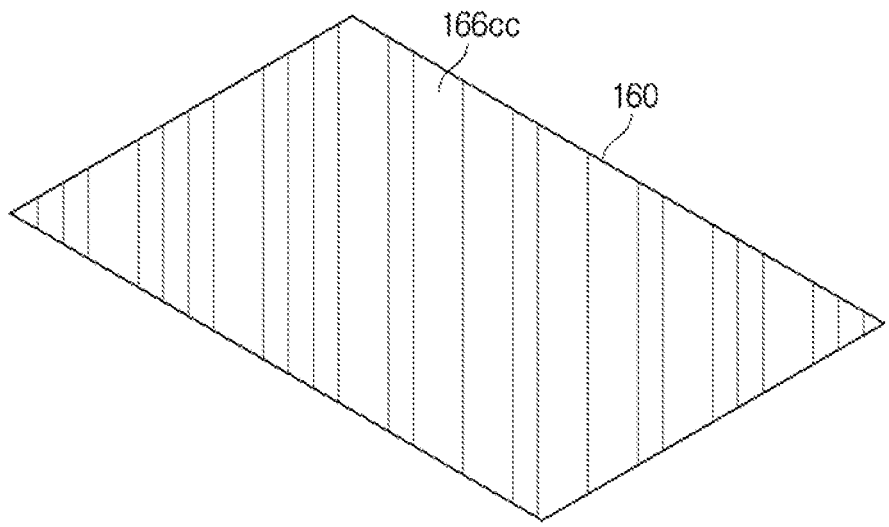

As shown in FIG. 24, the light diffusion portions 166cc may extend in a diagonal direction of the display panel 100, and may be arranged in a direction that is orthogonal to the diagonal direction. The light diffusion portions 166cc may be uniformly distributed in the second resin layer 160.

Figure 25:
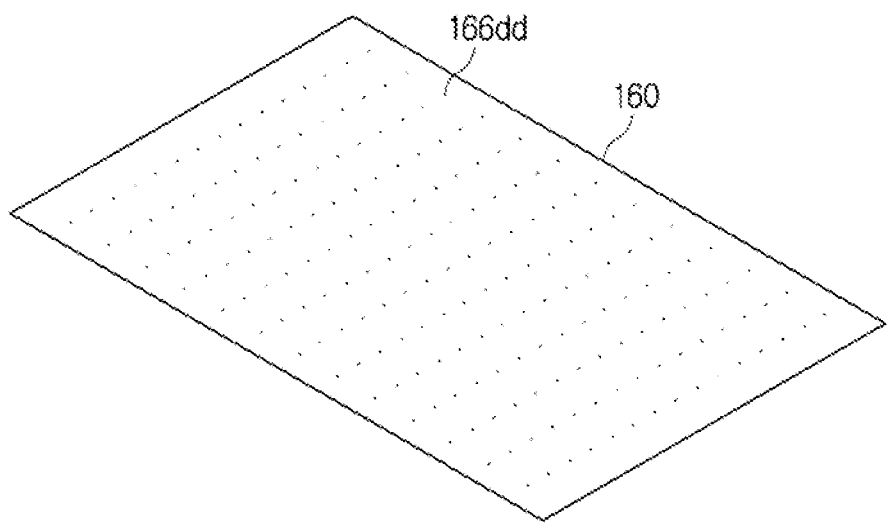

As shown in FIG. 25, the light diffusion portions 166dd may be formed in the shape of dots, and distributed in the second resin layer 160. The light diffusion portions 166dd may be uniformly distributed as shown in FIG. 25. Alternatively, the light diffusion portions 166dd may be concentrated at a predetermined area.

Figure 26:
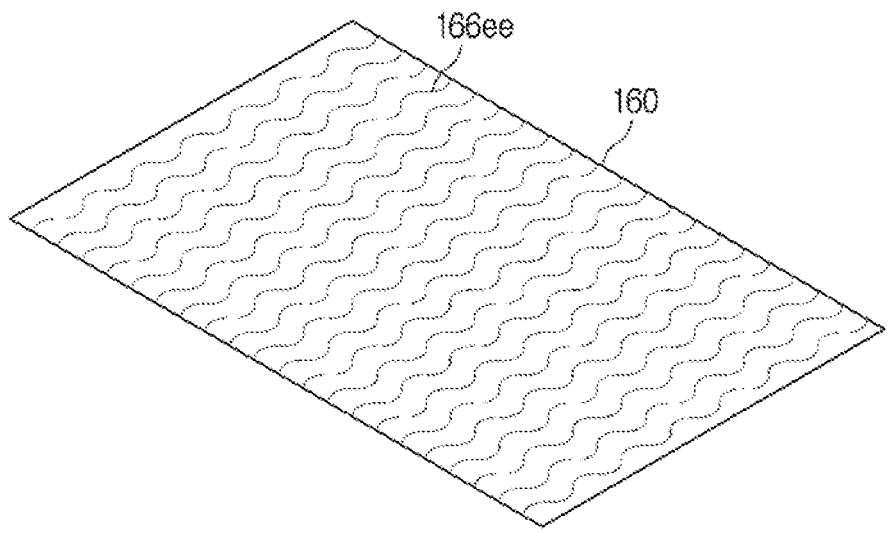

As shown in FIG. 26, the light diffusion portions 166ee may be formed in the shape of waves in one direction in the second resin layer 160, and arranged in a direction that is orthogonal to the one direction. The light diffusion portions 166ee may be uniformly distributed in the second resin layer 160.

Figure 27:
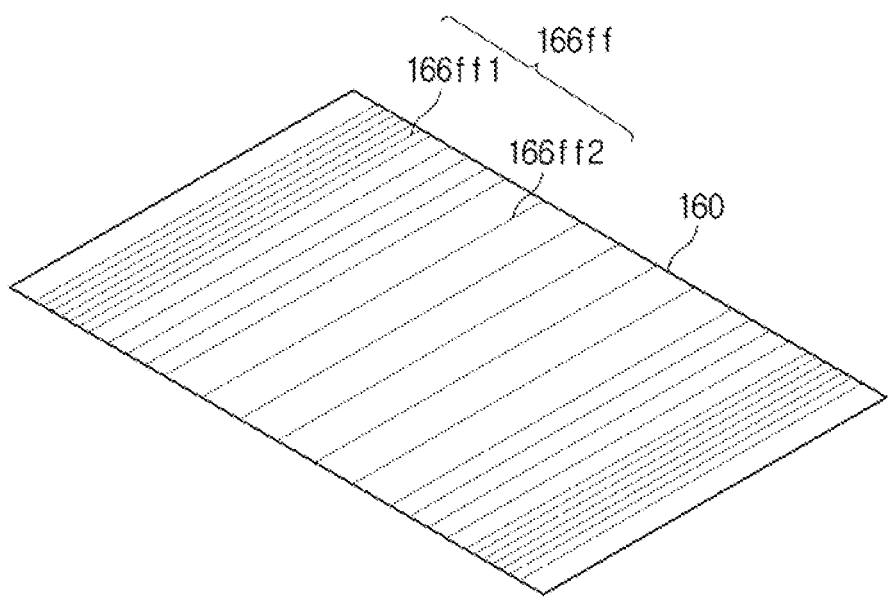

As shown in FIG. 27, a plurality of light diffusion portions 166ff may be arranged in the second resin layer 160 at different densities according to areas. That is, the light diffusion portions 166ff may include a plurality of first light diffusion portions 166ff1 arranged in a first area of the second resin layer 160, and a plurality of second light diffusion portions 166ff2 arranged in a second area of the second resin layer 160. The first light diffusion layers 166ff1 may be more concentrated than the second light diffusion portions 166ff2. In the current embodiment, the first area may be disposed to the left and right of the second area, although not limited thereto.

According to one or more embodiments, by improving the structure of the display panel, it is possible to improve the expression of black.

According to one or more embodiments, by improving a difference in light amount according to a viewing angle, it is possible to reduce a difference in image quality according to a viewing angle.

Although a few embodiments have been shown and described, it will be appreciated by those having ordinary skill in the art that changes may be made in these embodiments without departing from the principles and spirit of the disclosure, the scope of which is defined in the claims and their equivalents.

What is claimed is:

1. A display apparatus comprising:
a light source configured to emit light;
a display panel configured to receive the light emitted by the light source,
wherein the display panel comprises:
a liquid crystal panel;
a first polarizer disposed behind the liquid crystal panel;
a second polarizer disposed in front of the liquid crystal panel; and
an optical layer disposed on a front surface of the second polarizer, and
wherein the optical layer comprises:
a first resin layer comprising a plurality of concave grooves formed on a surface of the first resin layer facing the second polarizer;
a plurality of light absorption portions filled in the plurality of concave grooves and configured to absorb a part of incident light; and
a second resin layer disposed on a front surface of the first resin layer, the second resin layer having a refractive index that is higher than a refractive index of the first resin layer, and the second resin layer comprising a plurality of light diffusion portions configured to diffuse light not absorbed by the plurality of light absorption portions,
wherein the first resin layer and the second resin layer are configured to contact each other to form a concave-convex shape, and configured such that light not absorbed by the plurality of light absorption portions passes through the concave-convex shape.

2. The display apparatus of claim 1, wherein the light emitted by the light source to the display panel passes through the first polarizer, the liquid crystal panel, and the second polarizer, sequentially, and is incident upon the optical layer.

3. The display apparatus of claim 2, wherein the plurality of light absorption portions are configured to absorb light incident at a predetermined angle or more with respect to a reference axis in a front-rear direction of the display apparatus among light incident upon the optical layer.

4. The display apparatus of claim 3, wherein the plurality of light diffusion portions are configured to diffuse the light not absorbed by the plurality of light absorption portions and incident upon the plurality of light diffusion portions at the predetermined angle or less with respect to the reference axis.

5. The display apparatus of claim 3, wherein each of the plurality of light diffusion portions comprises a diffusion surface that is inclined with respect to an optical surface facing the first resin layer in the second resin layer, and configured to refract light passed through the first resin layer to be further tilted with respect the reference axis in the front-rear direction.

6. The display apparatus of claim 5, wherein each of the plurality of light diffusion portions comprises a concave optical surface that is formed in parallel to the optical surface, stepped from the optical surface, connected to the diffusion surface, and configured to transmit light incident upon the concave optical surface at a reduced angle with respect to the reference axis in the front-rear direction.

7. The display apparatus of claim 5, wherein the first resin layer comprises:
 a first optical surface that is in contact with the plurality of light diffusion portions;
 a second optical surface that is opposite to the first optical surface; and
 a plurality of grooves formed concavely in the second optical surface such that the plurality of light absorption portions are disposed in the plurality of grooves.

8. The display apparatus of claim 1, wherein the plurality of light diffusion portions are formed on an optical surface facing the first resin layer in the second resin layer, and a cross section of the plurality of light diffusion portions is formed in a concave-convex shape.

9. The display apparatus of claim 8, wherein the concave-convex shape of the cross section of the plurality of light diffusion portions includes at least one of a trapezoid, a quadrangle, a semicircle, and an oval.

10. The display apparatus of claim 1, wherein the plurality of light diffusion portions extend in a first direction on the second resin layer, and are arranged in a second direction that is orthogonal to the first direction.

11. The display apparatus of claim 10, wherein the first direction is one of a longitudinal direction, a transverse direction, and a diagonal direction.

12. The display apparatus of claim 10, wherein the plurality of light diffusion portions extend in a shape of waves in the first direction.

13. The display apparatus of claim 10, wherein the plurality of light absorption portions extend in the first direction, and are arranged in the second direction.

14. The display apparatus of claim 10, wherein the plurality of light absorption portions extend in a third direction that is different from the first direction, and are arranged in a fourth direction that is orthogonal to the third direction.

15. The display apparatus of claim 1, wherein the plurality of light diffusion portions are formed in a shape of dots, and distributed on the second resin layer so as to be spaced apart from each other.

16. The display apparatus of claim 1, wherein the plurality of light diffusion portions comprise:
 a first diffusion portion;
 a second diffusion portion spaced a first distance from the first diffusion portion; and
 a third diffusion portion spaced a second distance from the second diffusion portion, and
 wherein the first distance is different from the second distance.

17. The display apparatus of claim 1, wherein the display panel further comprises an adhesive layer provided between the optical layer and the second polarizer, and
 wherein the adhesive layer is formed with a refractive index that is equal to or smaller than the refractive index of the first resin layer.

18. The display apparatus of claim 1, wherein a width of the plurality of concave grooves at the surface of the first resin layer facing the second polarizer is greater than or equal to a width of the plurality of light absorption portions at a surface of the plurality of light absorption portions facing the second polarizer.

19. The display apparatus of claim 1, wherein the plurality of light absorption portions directly contact the second polarizer.

20. A display apparatus comprising:
 an optical sheet disposed in front of a liquid crystal panel, the optical sheet comprising:
  a resin layer comprising a plurality of concave grooves formed on a surface of the resin layer;
  an absorption layer comprising a plurality of light absorption portions filled in the plurality of concave grooves and configured to absorb light traveling at a predetermined angle or more with respect to a direction perpendicular to a front surface of the display apparatus; and
  a diffusion layer disposed in front of the absorption layer, the diffusion layer configured to diffuse light traveling at the predetermined angle or less with respect to the direction perpendicular to the front surface of the display apparatus,
 wherein the resin layer and the diffusion layer are configured to contact each other to form a concave-convex shape, and configured such that light not absorbed by the absorption layer passes through the concave-convex shape.

21. A display apparatus comprising:
 a light source configured to emit light; and
 a display panel configured to receive the light emitted by the light source,
 wherein the display panel comprises:
  a liquid crystal panel;
  a first polarizer coupled with a rear portion of the liquid crystal panel;
  a second polarizer coupled with a front portion of the liquid crystal panel; and
  an optical layer coupled with a front surface of the second polarizer,
 wherein the optical layer comprises:
  a first resin layer having a first optical surface and a groove recessed in the first optical surface;
  a second resin layer being in contact with a second optical surface of the first resin layer that is opposite to the first optical surface, the second resin layer having a refractive index that is higher than a refractive index of the first resin layer;
  a light absorption portion disposed in the groove, the light absorption portion being configured to absorb a part of light passing through the optical layer; and
  a light diffusion portion disposed in front of the light absorption portion,
 wherein the first resin layer and the second resin layer are configured to contact each other to form a concave-convex shape, and configured such that light not absorbed by the light absorption portion passes through the concave-convex shape, wherein the light absorption portion is further configured to absorb light traveling at a predetermined angle or more with respect to a direction perpendicular to a front surface of the display apparatus, and wherein the light diffusion portion is configured to diffuse light traveling at the predetermined angle or less with respect to the direction perpendicular to the front surface of the display apparatus.

* * * * *